United States Patent
Itoh et al.

(10) Patent No.: US 9,676,563 B2
(45) Date of Patent: Jun. 13, 2017

(54) TRANSFER APPARATUS

(71) Applicant: Itoh Denki Co., Ltd., Kasai-shi, Hyogo (JP)

(72) Inventors: Kazuo Itoh, Kasai (JP); Tatsuhiko Nakamura, Hyogo (JP); Jun Maekawa, Takasago (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 14/956,953

(22) Filed: Dec. 2, 2015

(65) Prior Publication Data
US 2016/0229644 A1 Aug. 11, 2016

(30) Foreign Application Priority Data

Feb. 6, 2015 (JP) ................................. 2015-022339

(51) Int. Cl.
*B65G 47/46* (2006.01)
*B65G 47/54* (2006.01)

(52) U.S. Cl.
CPC ............ *B65G 47/54* (2013.01); *B65G 47/46* (2013.01)

(58) Field of Classification Search
CPC ......... B65G 47/53; B65G 47/54; B65G 47/46
USPC ............................... 198/369.6, 370.09, 371.3
See application file for complete search history.

(56) References Cited

U.S. PATENT DOCUMENTS

| | | | | |
|---|---|---|---|---|
| 3,173,554 A * | 3/1965 | Ebbert | .................. | B65G 47/54 198/370.09 |
| 3,642,113 A * | 2/1972 | Burgis | .................. | B65G 47/71 198/370.09 |
| 3,782,527 A * | 1/1974 | Petershack | ............. | B65G 47/54 193/35 SS |
| 4,962,841 A * | 10/1990 | Kloosterhouse | ....... | B65G 47/54 198/370.09 |
| 6,382,393 B2 * | 5/2002 | Itoh | ........................ | B65G 47/54 198/370.09 |
| 8,312,981 B2 * | 11/2012 | Franz | ..................... | B65G 47/54 198/370.09 |

FOREIGN PATENT DOCUMENTS

| | | |
|---|---|---|
| DE | 2520294 | 11/1976 |
| DE | 3129388 | 3/1983 |
| EP | 1108662 A1 | 6/2001 |
| GB | 2126556 A | 3/1984 |
| JP | 2005280868 A | 10/2005 |
| JP | 2013-230914 A | 11/2013 |
| WO | WO-92/19520 | 11/1992 |

OTHER PUBLICATIONS

Search Report issued by the UK Patent Office on Apr. 21, 2016 in Application No. GB1520849.9.

* cited by examiner

*Primary Examiner* — James R Bidwell
(74) *Attorney, Agent, or Firm* — Wood, Phillips, Katz, Clark & Mortimer

(57) ABSTRACT

A long roller conveyor device having a plurality of long rollers and a short roller conveyor device having a plurality of short roller rows each of which includes a plurality of short rollers are used. Rotation axes of the long rollers and rotation axes of the short rollers cross each other. Each of the short roller rows is arranged between the long rollers. On a conveying passage, any of the long rollers and the short roller rows are arranged.

21 Claims, 16 Drawing Sheets

TRANSFER APPARATUS

TECHNICAL FIELD

The present invention relates to a transfer apparatus forming a part of a conveyor line, and particularly relates to a transfer apparatus capable of turning the conveying direction of a conveyed item to the direction crossing the carry-in direction.

BACKGROUND ART

In a product assembling line and an item distribution place, a conveyor line is frequently utilized for conveying a conveyed item. For example, in the distribution place, a large number of conveyor lines are installed in all directions, and a transfer apparatus is arranged at a position where the conveyor lines cross each other. That is, the transfer apparatus has a function of carrying an item out of the original conveyor line (main conveyor line), transferring the item to the other conveyor line (auxiliary conveyor line), and conveying to a desired place.

In order to exert the above function, the transfer apparatus includes two conveying conveyor sections that convey the item, and a lifting and lowering unit that changes a height position of the conveying conveyor sections. Each of the two conveying conveyor sections has a conveying passage on which the item is disposed and conveyed. The conveying directions of the conveying passages of the two conveying conveyor sections are different from each other. In the transfer apparatus, relative heights of the two conveying passages can be changed by the above lifting and lowering unit.

That is, in this type of transfer apparatus, by the lifting and lowering unit, a top surface of the conveying passage of the conveying conveyor section not relating to conveyance is retreated to the lower side of a conveying surface of the conveyor line, and further, a top surface of the conveying conveyor section contributing to the conveyance is lifted and exposed to the side of the conveying surface of the conveyor line. By actuating (letting run) the conveying conveyor section lifted to the side of the conveying surface, smooth conveyance can be achieved without the conveyance being disturbed by the conveying section not relating to the conveyance.

For example, a transfer apparatus that transfers a conveyed item is disclosed in Patent Document 1 (JP 2013-230914 A). In the transfer apparatus disclosed in Patent Document 1, an item can be conveyed in the direction along a main conveying line by a main conveying section, and the item can be conveyed in the direction along an auxiliary conveying line crossing the main conveying line by an auxiliary conveying section. With the transfer apparatus disclosed in Patent Document 1, a roller conveyor is disclosed as the main conveying section, and a belt conveyor is disclosed as the auxiliary conveying section.

PRIOR ART DOCUMENT

Patent Document

Patent Document 1: JP 2013-230914 A

DISCLOSURE OF INVENTION

Technical Problem

In the transfer apparatus disclosed in Patent Document 1, in a case where the item is conveyed in the direction along the main conveying line, the main conveying section of the roller conveyor is lifted to be on the upper side of the auxiliary conveying section of the belt conveyor and the item is conveyed by the main conveying section. When the present inventors actually operated this transfer apparatus, a belt of the auxiliary conveying section to be on the lower side of the main conveying section was sometimes turned up. It is thought that this phenomenon was caused for the following reason.

That is, the belt conveyor is lowered by the action of gravity but not forcefully lowered downward by a cam mechanism or the like. Therefore, when a part of the belt conveyor is hanged onto something, the belt conveyor is not sufficiently lowered to a height to which the belt conveyor should essentially be lowered. Since the item is conveyed by the roller conveyor, the conveying direction of the item and the running direction of the belt of the belt conveyor cross each other. When the item is brought into contact with the belt, the belt is easily turned up.

The item includes ones formed in various shapes. There is a possibility that a part of the item is brought into contact with the lowered and retreated belt of the belt conveyor and the belt is turned up.

When the belt is turned up, running of the belt is disturbed, and the item cannot be moved along the auxiliary conveying line by the belt conveyor.

Focusing on the above problem of the related art, an object of the present invention is to develop a transfer apparatus having two conveying sections that convey an item in the directions crossing each other, and conveying the item by selectively lifting either of the conveying sections, with which even when the item is brought into contact with the other conveying section while the item being conveyed by one of the conveying sections, no failure is caused in the other conveying section.

Solution to Problem

In order to achieve the above object, an aspect of the present invention is a transfer apparatus including a frame, a main conveying conveyor section that has a main conveying passage placed in a fixed planar region for conveying a conveyed item in a fixed direction, an auxiliary conveying conveyor section that has an auxiliary conveying passage arranged in the same planar region as the main conveying passage for conveying the conveyed item in the direction crossing the conveying direction of the main conveying passage, and a lifting and lowering unit that lifts and lowers at least one of the main conveying conveyor section and the auxiliary conveying conveyor section so as to lift one of the conveying passages to the upper side of the other conveying passage and to convey the conveyed item in the desired direction, wherein one of the main conveying conveyor section and the auxiliary conveying conveyor section is a wide conveyor device in which a plurality of long rotation members having predetermined length is arranged in parallel, whereas the other conveying conveyor section is a narrow conveyor device in which a plurality of small rotation member rows are arranged in parallel, wherein each of the small rotation member rows has a plurality of short rotation members arranged along the longitudinal direction of the long rotation members with rotation axes thereof placed in the direction crossing rotation axes of the long rotation members, and wherein the narrow conveyor device includes a plurality of annular members arranged along the row of the short rotation members so as to transmit mechanical power to the short rotation members rotating in accordance with running of the annular members by contacting with the short rotation members directly or indirectly, and a power source that runs the annular members.

With the "long rotation members" and the "short rotation members", the terms "long" and "short" are only to compare both the rotation members but not to limit an aspect ratio for an individual rotation member. For example, the aspect ratio of the "short rotation members" may be vertically long.

Desirably, the long rotation members are rollers, whereas the short rotation members are short rollers; and the wide conveyor device is a roller conveyor device, whereas the narrow conveyor device is a short roller conveyor device.

Another aspect of the present invention is a transfer apparatus including a frame, a main conveying conveyor section that has a main conveying passage placed in a fixed planar region for conveying a conveyed item in a fixed direction, an auxiliary conveying conveyor section that has an auxiliary conveying passage arranged in the same planar region as the main conveying passage for conveying the conveyed item in the direction crossing the conveying direction of the main conveying passage, and a lifting and lowering unit that lifts and lowers at least one of the main conveying conveyor section and the auxiliary conveying conveyor section so as to lift one of the conveying passages to the upper side of the other conveying passage and to convey the conveyed item in the desired direction, wherein one of the main conveying conveyor section and the auxiliary conveying conveyor section is a roller conveyor device in which a plurality of long rollers are arranged in parallel, whereas the other conveying conveyor section is a short roller conveyor device in which a plurality of short roller rows are arranged in parallel, wherein each of the short roller rows has a plurality of short rollers arranged along the longitudinal direction of the long rollers with rotation axes thereof placed in the direction crossing rotation axes of the long rollers, and wherein the short roller conveyor device includes a plurality of annular members arranged along the row of the short rollers so as to transmit mechanical power to the short rollers rotating in accordance with running of the annular members by contacting with the short rollers directly or indirectly, and a power source that runs the annular members.

Desirably, upper parts of the short rollers protrude to the upper side of the annular member.

In the above aspects, one of the main conveying conveyor section and the auxiliary conveying conveyor section is the long roller conveyor device in which the plurality of long rollers are arranged in parallel, and the other conveying conveyor section is the short roller conveyor device in which the plurality of short roller rows are arranged in parallel.

The short roller conveyor device has the power source that lets the plurality of annular members run, and each of the annular members is arranged along each short roller row to be brought into contact with the short rollers to transmit mechanical power to the short rollers. Thus, by letting the annular member run, the short rollers can be driven and rotated. When the conveyed item is disposed on the short rollers, the conveyed item is conveyed by the rotating short rollers.

At the time of conveying the conveyed item by the long roller conveyor device, even in a case where the conveyed item is brought into contact with the short roller conveyor device retreated to the lower side, or a part of the short roller conveyor device is hanged onto something and the short roller conveyor device is not sufficiently lowered to a height to which the short roller conveyor device should essentially be lowered, a posture and a state of the short roller conveyor device are not changed.

That is, the short rollers are fixed on the rotation axes. Thus, the short roller can bear even upon receiving external force not only in the conveying direction but also in the direction crossing the conveying direction.

Therefore, in the short roller conveyor device, the upper parts of the short rollers protrude to the upper side of the annular member. Thus, the conveyed item may be brought into contact with the upper parts of the short rollers but not brought into contact with the annular member. Therefore, a posture and a state of the annular member are not changed.

The short rollers include cylindrical short rollers, and spherical short rollers.

In addition to the above configuration, desirably, the short roller conveyor device has a plurality of pulleys, the annular members are belts and engaged with the pulleys and the short rollers, a suspension route of each of the annular members is complicated and has a plurality of corners, and any of the short rollers or all the short rollers are located in places to form the corner.

In addition to the above configuration, desirably, the short roller conveyor device has a plurality of pulleys, the annular members are belts to be engaged with the pulleys, each of the short rollers is arranged between the two pulleys, and the short rollers are arranged at positions getting across a tangent line shared by the two pulleys.

In addition to the above configuration, desirably, the short roller conveyor device has a wall shape member, and a plurality of the short rollers are rotatably and axially fixed to the wall shape member.

In addition to the above configuration, desirably, the short roller conveyor device has a wall shape member and a plurality of pulleys, a plurality of the short rollers and a plurality of the pulleys are rotatably and axially fixed to the wall shape member, and the annular member is suspended on the pulleys.

In addition to the above configuration, desirably, the short roller conveyor device has a plurality of wall shape members; a plurality of pulleys, a plurality of the short rollers, and the annular member are attached to each of the wall shape members to form the narrow conveyor including the short roller row; wherein the wall shape members are supported by a support member and stand at fixed intervals in parallel, and each of the wall shape members is arranged between the rollers of the roller conveyor device.

In addition to the above configuration, desirably, the power source of the short roller conveyor device is a long drive roller, and one of the drive rollers is engaged with a plurality of the annular members.

Desirably, a friction member is provided on an outer circumference of the short roller.

In the present aspect, the friction member is provided on the outer circumference of the short roller. Thus, frictional force between the short roller and the annular member is increased. Therefore, mechanical power is easily transmitted from the side of the annular member to the side of the short roller.

Desirably, the annular member is engaged with a part of a circumferential surface of the short roller within a predetermined angle range.

For example, desirably, the annular member is engaged at an angle of 5 degrees or more.

In the present aspect, the annular member is engaged with the part of the circumferential surface of the short roller within the predetermined angle range. Thus, a contact area between the annular member and the short roller is ensured, and the annular member and the short roller are closely attached to each other. Therefore, mechanical power is easily transmitted between the annular member and the short roller. The part within the predetermined angle range indicates one part of the circumferential surface of 360 degrees about rotation center of the short roller. That is, the short roller and the annular member are in surface-contact with each other.

Desirably, the short rollers of each of the short roller rows are arranged at positions different from the short rollers of the adjacent short roller row in the longitudinal direction of the long rollers.

In the present aspect, the short rollers of each short roller row are arranged at the positions different from the short rollers of the adjacent short roller row in the longitudinal direction of the long rollers. Thus, the short rollers are in zig-zag arrangement, so that support of the conveyed item is stabilized.

Desirably, the lifting and lowering unit has a motor, and a lifting and lowering mechanism formed by combining a plurality of members; and the lifting and lowering mechanism has a pinion gear, a rack, a cam section to be linearly moved by the rack, and a cam follower provided in the main conveying conveyor section or the auxiliary conveying conveyor section.

Desirably, the transfer apparatus has a regulating unit that regulates at least one of the main conveying conveyor section and the auxiliary conveying conveyor section to be linearly lifted and lowered, the regulating unit being a warping plate body and being attached between the frame and the main conveying conveyor section or the auxiliary conveying conveyor section in such a posture that the warping direction of the regulating unit matches with the direction in which the main conveying conveyor section or the auxiliary conveying conveyor section is lifted and lowered.

Effect of Invention

With the transfer apparatus of the present invention, even when the conveyed item is brought into contact with the conveyor device retreated to the lower side, the conveyor device not relating to conveyance, the posture and the state of the conveyor device are not changed. Therefore, the conveyor device retreated to the lower side can properly convey the conveyed item at the time of being lifted.

BRIEF DESCRIPTION OF DRAWINGS

FIG. 6A shows a state of the main conveying conveyor section; FIG. 6B shows a state of the auxiliary conveying conveyor section; and FIG. 6C shows relationships between cam followers belonging to the conveying conveyor sections and the horizontal movement member;

FIG. 7A shows a state of the main conveying conveyor section; FIG. 7B shows a state of the auxiliary conveying conveyor section; and FIG. 7C shows relationships between cam followers belonging to the conveying conveyor sections and the horizontal movement member;

FIG. 8A shows a state of the main conveying conveyor section; FIG. 8B shows a state of the auxiliary conveying conveyor section; and FIG. 8C shows relationships between cam followers belonging to the conveying conveyor sections and the horizontal movement member;

FIG. 9A is a plan view thereof; FIG. 9B is a sectional view of a state where the auxiliary conveying conveyor section is lifted and the main conveying conveyor section is brought down; and FIG. 9C is a sectional view of a state where the main conveying conveyor section is lifted and the auxiliary conveying conveyor section is brought down;

DETAILED DESCRIPTION OF THE PREFERRED EMBODIMENT

Hereinafter, a transfer apparatus 1 of an embodiment of the present invention will be described. In the transfer apparatus 1 of the present embodiment, the number of parts is large and shapes of the parts are not only complicated but also entangled. In order to facilitate understanding of the invention, the outline and characteristic configurations of the transfer apparatus 1 will be described at first, and then specific configurations of the parts will be described.

Figure 3:
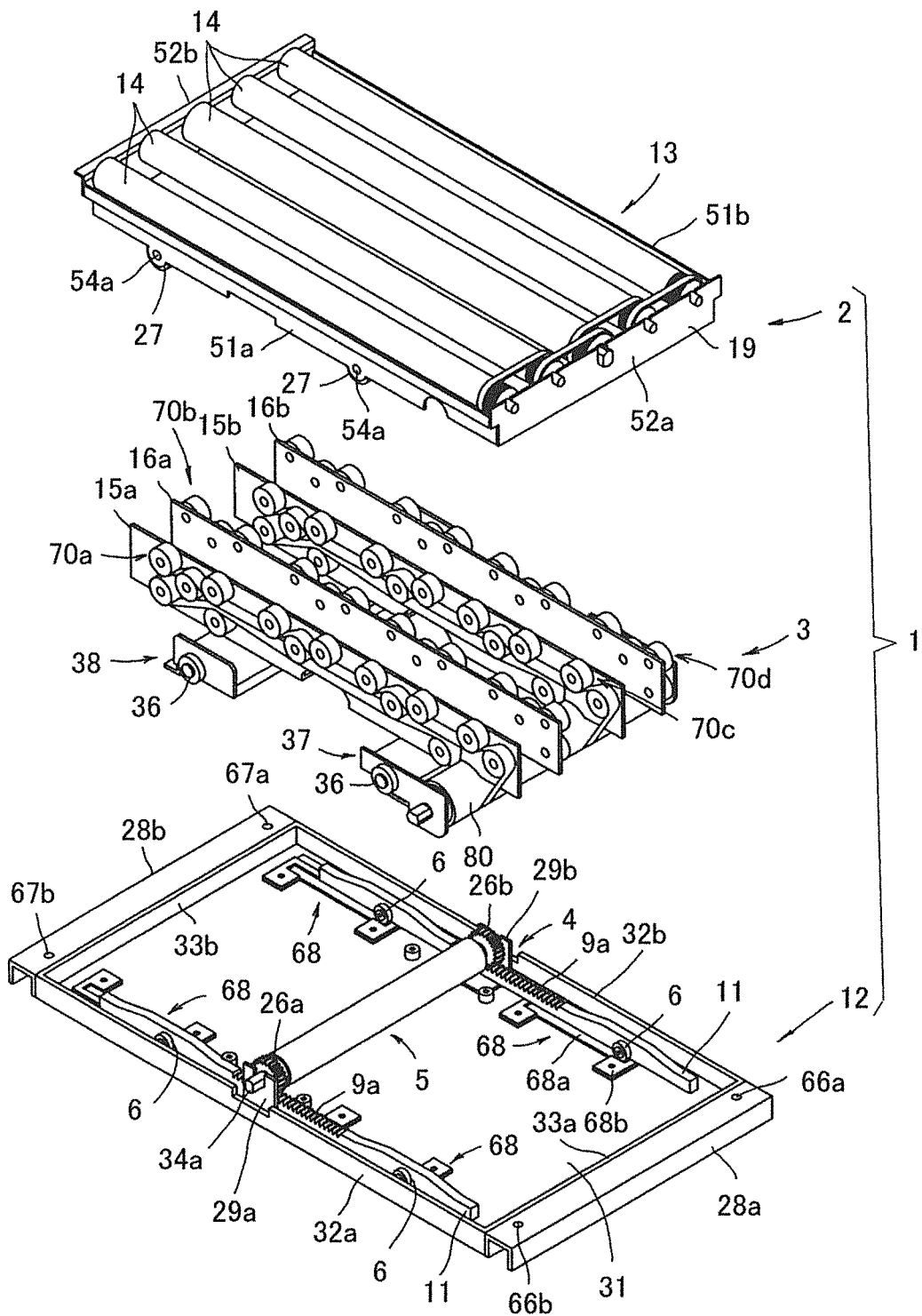
FIG. 3 is an exploded perspective view of a transfer apparatus of an embodiment of the present invention.

As shown in FIG. 3, the transfer apparatus 1 of the present embodiment includes an auxiliary conveying conveyor section 2, a main conveying conveyor section 3, a lifting and lowering mechanism 4, and a motor-incorporating roller 5. In the transfer apparatus 1 of the present embodiment, regulating units 72, 73 (FIG. 9) are provided so that the auxiliary conveying conveyor section 2 and the main conveying conveyor section 3 are linearly lifted and lowered in a straight form.

The auxiliary conveying conveyor section 2 of the transfer apparatus 1 is a roller conveyor device in which a plurality of conveying rollers 14 are arranged in parallel. Since an individual conveying member (conveying roller 14) has length corresponding to the entire width of the auxiliary conveying conveyor section 2, it can be said that the auxiliary conveying conveyor section 2 is a wide conveyor device.

As shown in FIG. 3, the auxiliary conveying conveyor section 2 of the transfer apparatus 1 has a plurality of conveying rollers 14 (long rollers), and a long roller side frame 19 rotatably supporting the conveying rollers 14. At four points of the lower part of the long roller side frame 19, cam followers 27 are respectively provided as in FIG. 4. The cam followers 27 are short rollers. The auxiliary conveying conveyor section 2 is a unit formed by integrating a plurality of the conveying rollers 14 (FIG. 3) and the four cam followers 27 into the long roller side frame 19.

At least one of the plurality of the conveying rollers 14 (long rollers) is a drive roller, and the other conveying rollers 14 are follower rollers. Mechanical power is transmitted between the drive roller and the follower rollers by belts. In the auxiliary conveying conveyor section 2, a conveying passage is formed by a plurality of the conveying rollers 14, and an item 25 (FIG. 1) serving as a conveyed item disposed on the conveying passage is conveyed by rotating the conveying rollers 14.

Horizontal movement of the long roller side frame 19 is regulated by the regulating units 73a to 73d, and reciprocating movement of the long roller side frame 19 can be made only in the up and down direction.

A summary of a structure of the main conveying conveyor section 3 is as follows.

Figure 10:
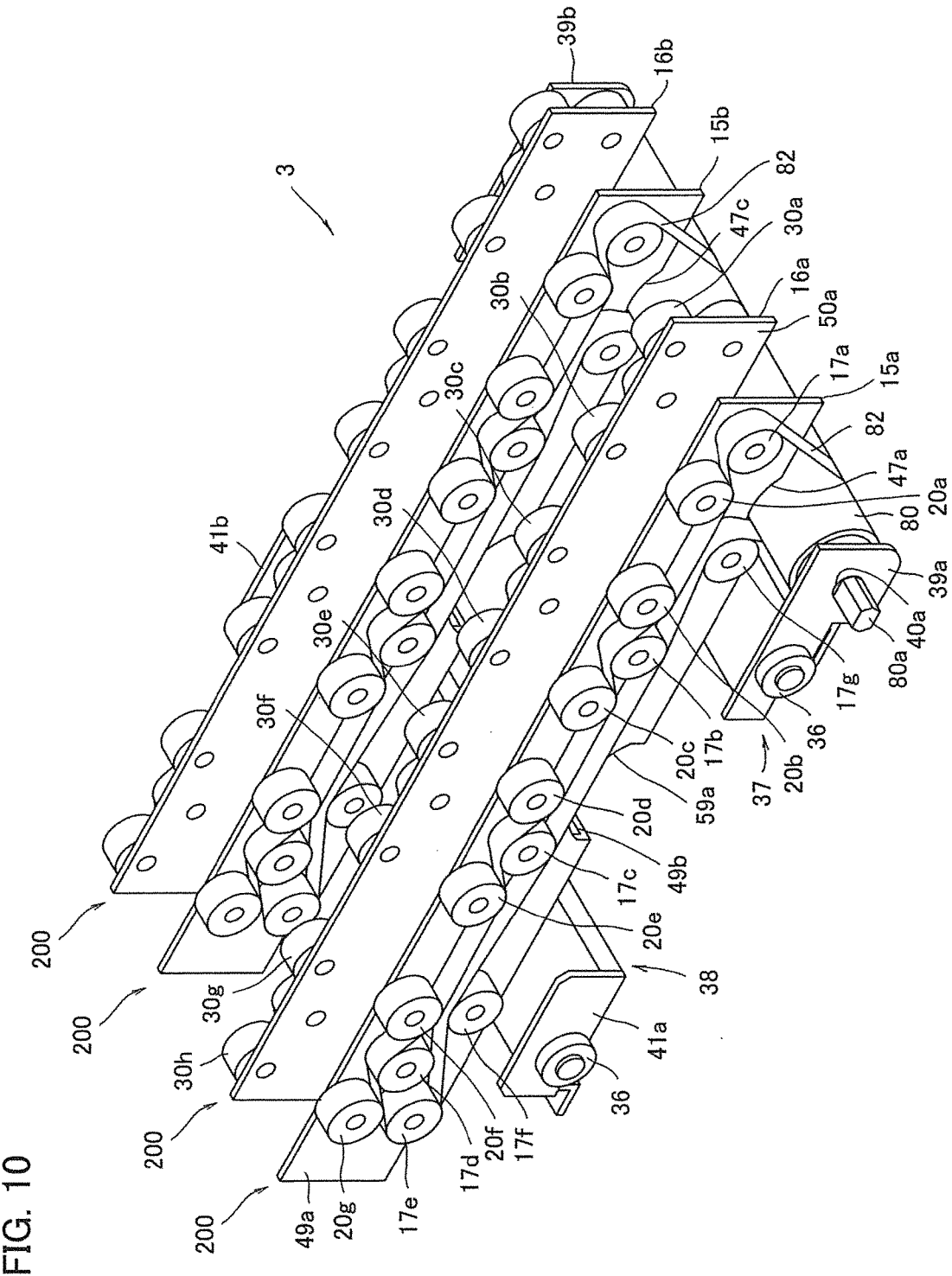
FIG. 10 is a perspective view of a main conveying conveyor section.

As shown in FIG. 10, the main conveying conveyor section 3 is a collective body of narrow conveyors 200 in which short rollers 20a to 20g, 30a to 30h forming small rotation member rows serve as conveying members and the short rollers are provided in rows.

As shown in FIG. 10, the main conveying conveyor section 3 is formed by fixing members 15a, 16a, 15b, 16b, support members 37, 38, the short rollers 20a to 20g, the short rollers 30a to 30h, a belt drive roller 80 (power source), and the like. Although the short rollers 20a to 20g, 30a to 30h are short rotation members formed in a cylindrical shape, in place of these, spherical short rollers can also be adopted.

Figure 13:
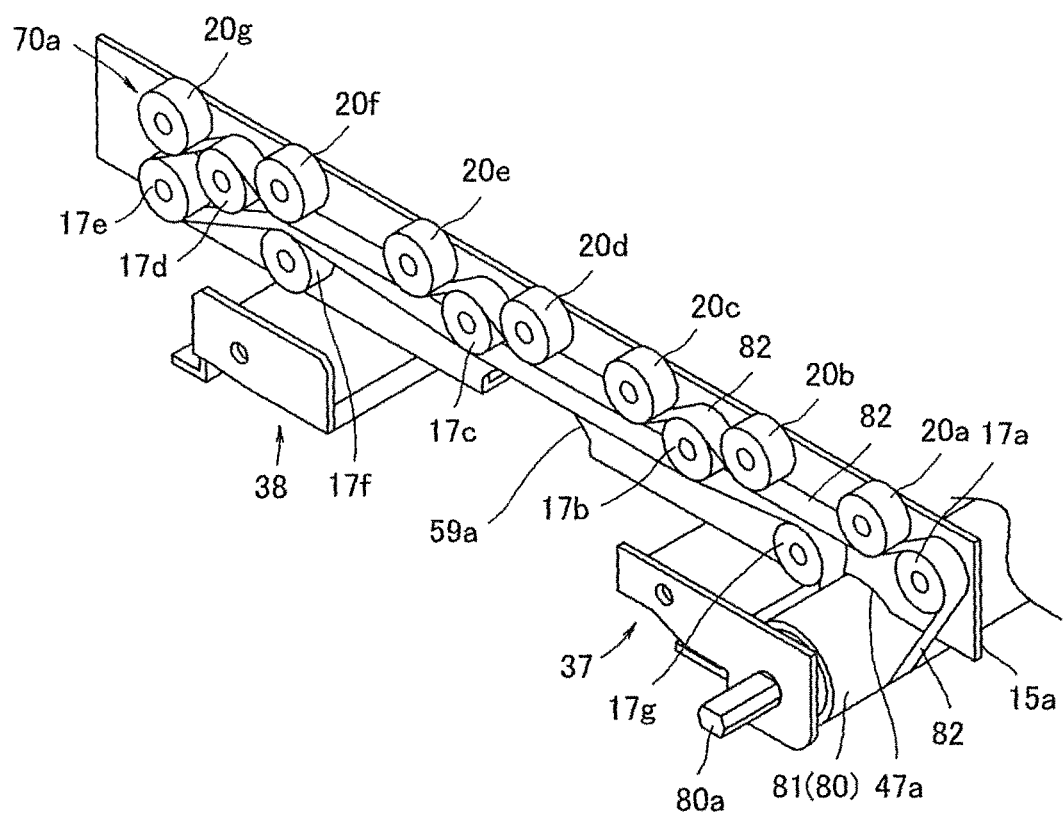
FIG. 13 is a perspective view of a short roller row serving as a constituent member of a main conveying conveyor section.
Figure 14:
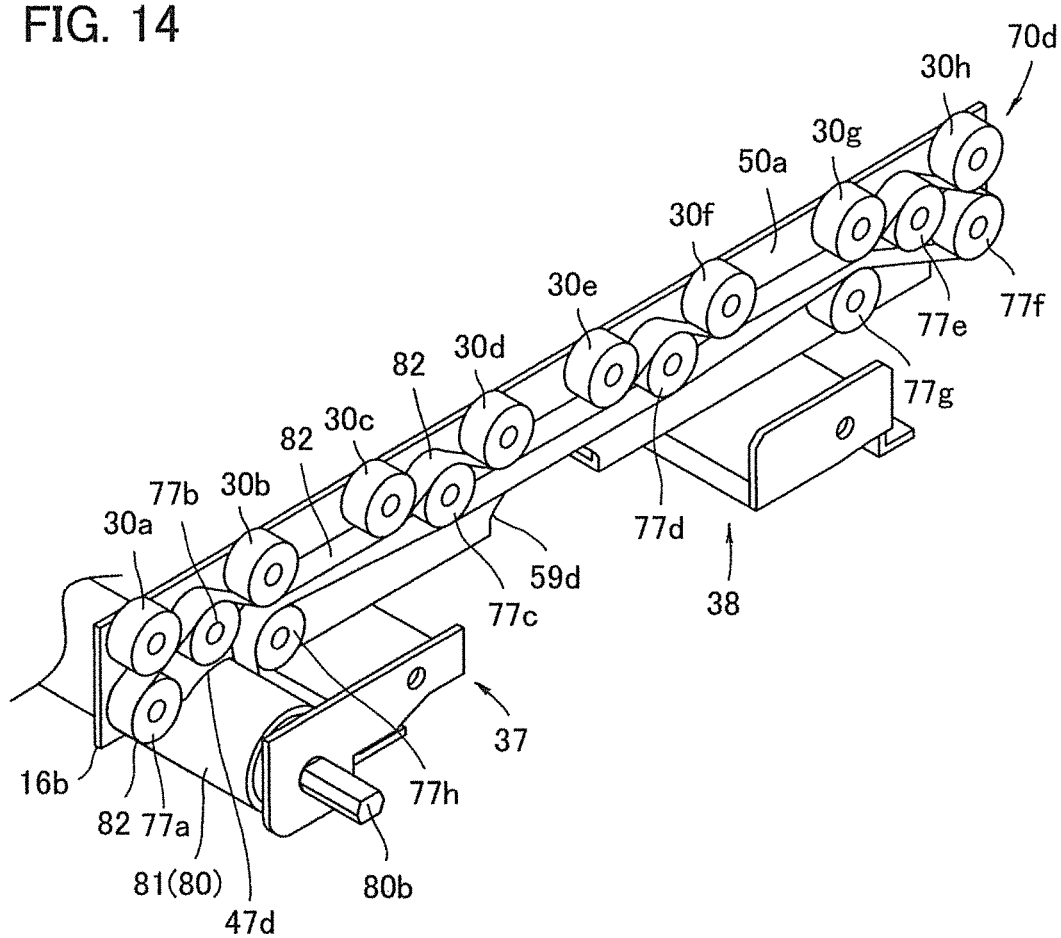
FIG. 14 is a perspective view of a short roller row serving as a constituent member of a main conveying conveyor section, the short roller row being different from the one in FIG. 13.

As shown in FIG. 13, pulleys 17a to 17g and the short rollers 20a to 20g are fixed to the fixing members 15a, 15b. As shown in FIG. 14, pulleys 77a to 77h and the short rollers 30a to 30h are fixed to the fixing members 16a, 16b. The fixing members 15a, 16a, 15b, 16b are fixed to the support members 37, 38.

That is, the fixing members 15a, 16a, 15b, 16b and the support members 37, 38 are integrated to be one unit. The fixing members 15a, 16a, 15b, 16b stand on the support members 37, 38.

Figure 4:
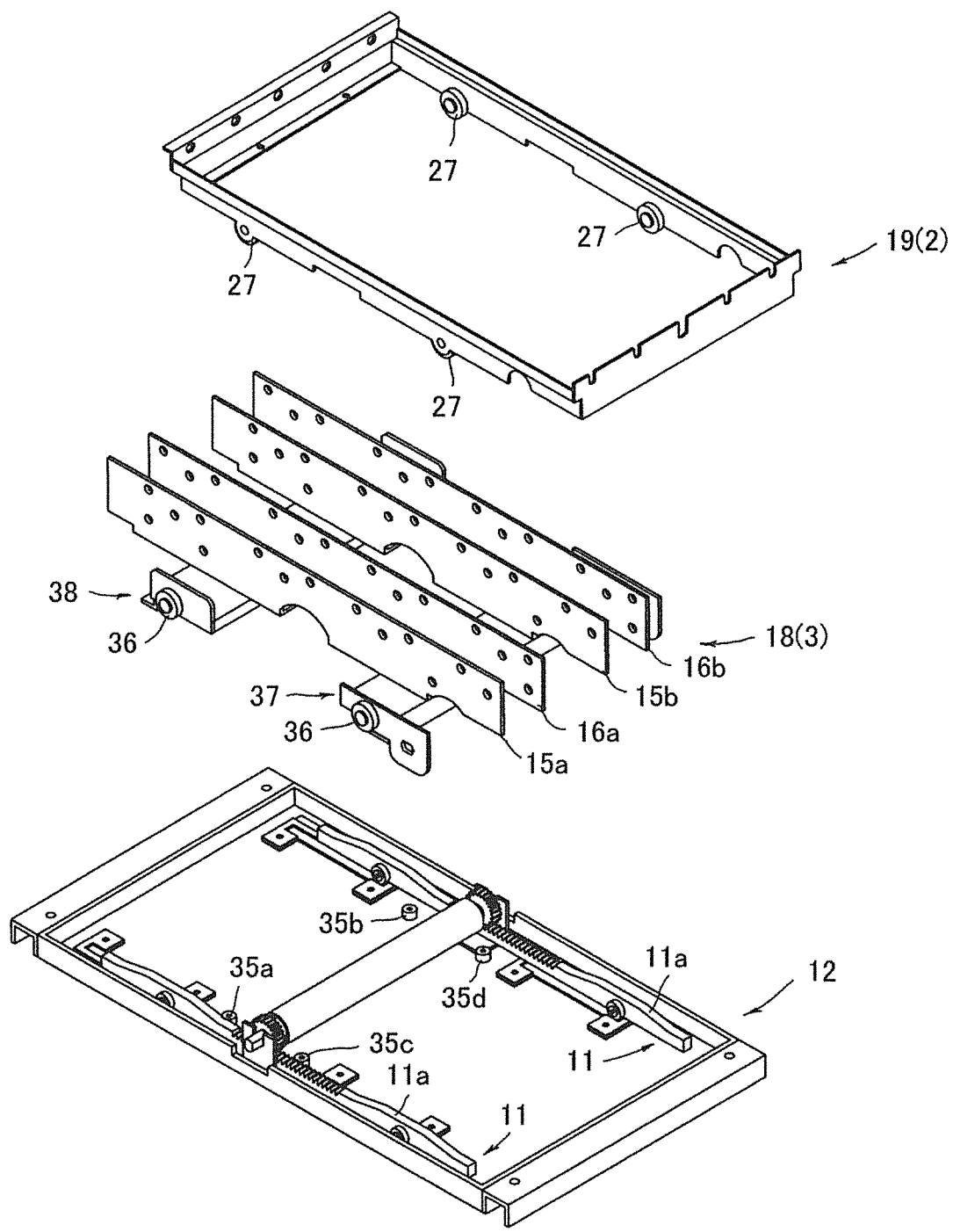
FIG. 4 is an exploded perspective view of a transfer apparatus in which belts and the like of a main conveying conveyor section and rollers and the like of an auxiliary conveying conveyor section are eliminated from the exploded perspective view of FIG. 3 and only frames or framework parts of the conveyor sections are shown.

The support members 37, 38 and the fixing members 15a, 16a, 15b, 16b are integrated to form a short-roller-side framework section 18 (FIG. 4).

Flange sections 39a, 39b are provided in both ends of the support member 37. The flange sections 39a, 39b support shafts 80a, 80b of the belt drive roller 80. The shafts 80a, 80b are non-rotatably fixed to the flange sections 39a, 39b.

Cam followers 36 are respectively attached to the flange sections 39a, 39b.

A belt 82 (annular member) is suspended on the pulleys 17a to 17g of each of the fixing members 15a, 15b, and the belt drive roller 80. The short rollers 20a to 20g press an upper surface of the belt 82 on the conveying passage side (upper side). Tensile force is applied to the belt 82, and the belt 82 is always closely attached to a part of a circumferential surface of each of the short rollers 20a to 20g.

That is, a part of the circumferential surface of each of the short rollers 20a to 20g, a part corresponding to a predetermined angle range about a rotation axis of each of the short rollers 20a to 20g, is in surface-contact with, thus always closely being attached to the belt 82.

A belt 82 (annular member) is also suspended on the pulleys 77a to 77h of each of the fixing members 16a, 16b, and the belt drive roller 80. The short rollers 30a to 30h press an upper surface of the belt 82 on the conveying passage side (upper side). Tensile force is applied to the belt 82, and the belt 82 is always closely attached to a part of a circumferential surface of each of the short rollers 30a to 30h within a predetermined angle range.

Next, a lifting and lowering unit will be described. In the present embodiment, the lifting and lowering unit is formed by the lifting and lowering mechanism 4 formed by combining a plurality of members and the motor-incorporating roller 5 as shown in FIG. 3.

Specifically, the lifting and lowering mechanism 4 is formed by pinion gears 26a, 26b, horizontal movement members 11, the above cam followers 27 belonging to the auxiliary conveying conveyor section 2, the cam followers 36 belonging to the main conveying conveyor section 3, and the like.

The pinion gears 26a, 26b are attached to both ends of a roller main body 5a of the motor-incorporating roller 5. Therefore, when the roller main body 5a of the motor-incorporating roller 5 is rotated, the pinion gears 26a, 26b are rotated.

In the present embodiment, the two horizontal movement members 11 are arranged in parallel between the long roller side frame 19 and the short roller side framework section 18. A rack section 9 is provided in each of the horizontal movement members 11 to face the upper side. The horizontal movement members 11 can make reciprocating movement only in the longitudinal direction.

The above pinion gears 26a, 26b are engaged with the rack sections 9 formed to face the upper side.

Figure 5:
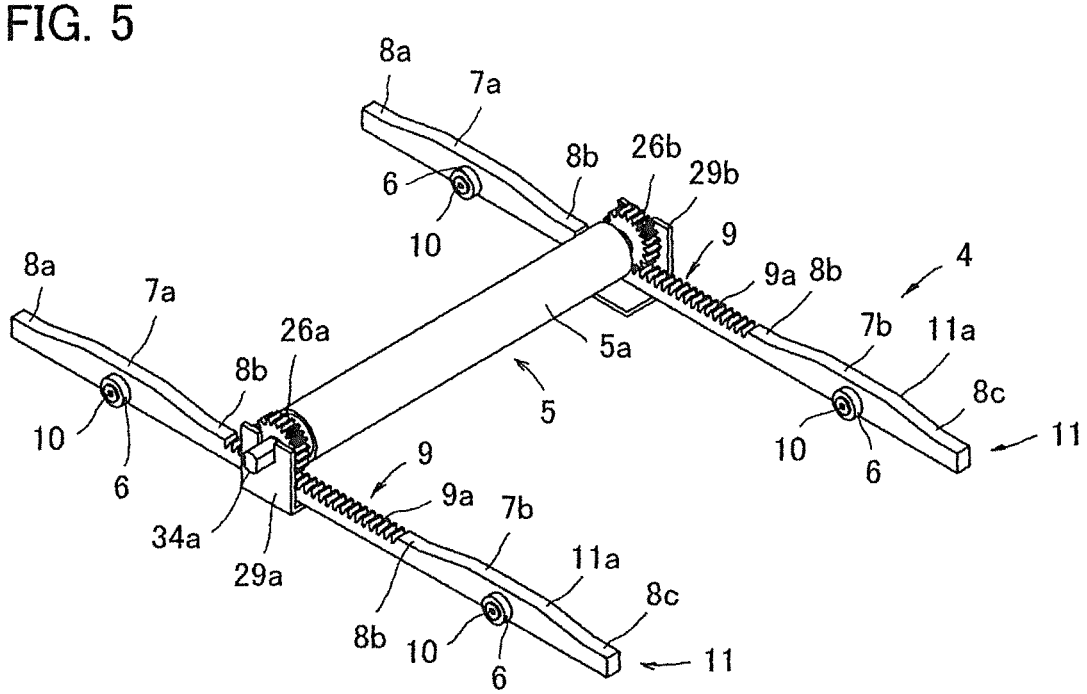
FIG. 5 is a perspective view of a lifting and lowering mechanism and a motor-incorporating roller serving as a drive source of the transfer apparatus of FIG. 2.
Figure 6A:
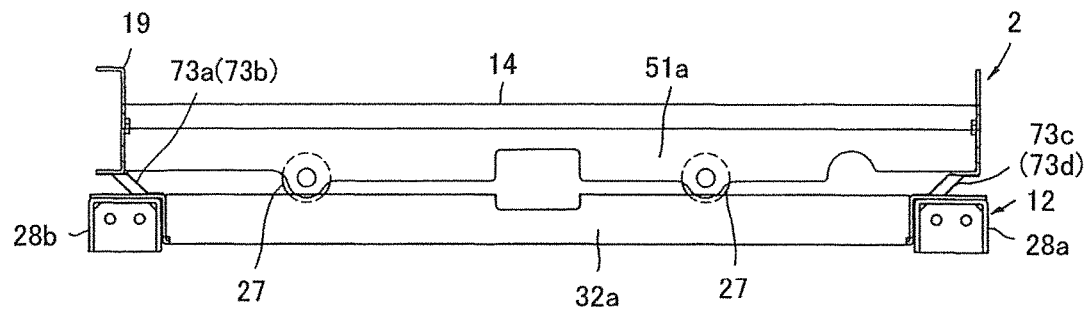
FIGS. 6A to 6C are explanatory diagrams showing relationships between conveying conveyor sections and a horizontal movement member in a case where both a main conveying conveyor section and an auxiliary conveying conveyor section are placed at a lifted position.
Figure 6B:
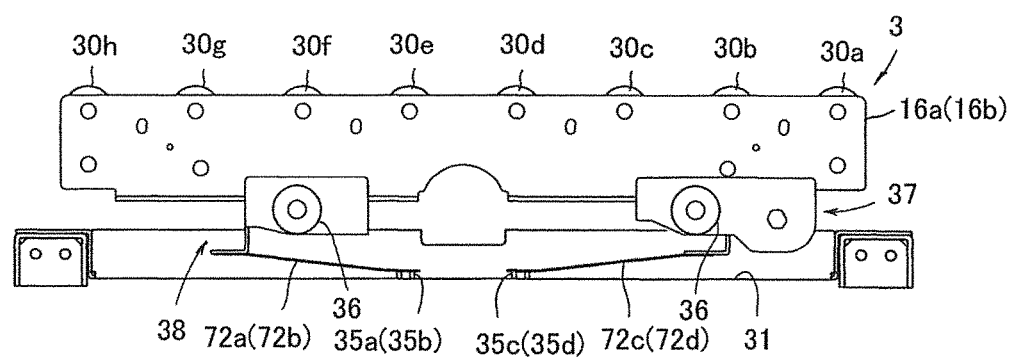

As shown in FIGS. 4, 5, 6, each of the horizontal movement members 11 is a direct acting type cam including a long upper surface 11a. The upper surface 11a has recessed and protruded parts. In order from one end in the longitudinal direction of the horizontal movement member 11, a first low position section 8a, a first high position section 7a, a second low position section 8b, a second high position section 7b, and a third low position section 8c are formed. That is, the first low position section 8a, the second low position section 8b, and the third low position section 8c serving as cam recessed parts are provided on the upper surface 11a of the horizontal movement member 11. The above rack section 9 is provided in a middle part of the second low position section 8b in a center part of this upper surface 11a.

The above pinion gears 26a, 26b are meshed with the rack sections 9. By transmitting mechanical power from the forward-rotated or backward-rotated pinion gears 26a, 26b, the horizontal movement members 11 make reciprocating movement in the horizontal direction. That is, by rotating the above motor-incorporating roller 5, mechanical power is transmitted to the horizontal movement members 11, so that the horizontal movement members 11 make reciprocating movement.

The cam followers 27 provided in the above long roller side frame 19 and the cam followers 36 provided in the short roller side framework section 18 are fitted into the cam recessed parts (including the first low position section 8a, the second low position section 8b, and the third low position section 8c).

That is, when the motor-incorporating roller 5 is rotated, the pinion gears 26a, 26b are rotated, and the upper surfaces 11a of the horizontal movement members 11 are moved horizontally rightward while rotating the cam followers 27, as shown in FIG. 7, the cam followers 27 are dropped off to the first low position sections 8a and the second low position sections 8b serving as the cam recessed parts. As a result, the long roller side frame 19 integrated with the cam followers 27 are brought down, so that the auxiliary conveying conveyor section 2 is lowered down. Meanwhile, since the cam followers 36 are placed on the first high position sections 7a and the second high position sections 7b of the horizontal movement members 11, the main conveying conveyor section 3 remains at a lifted position.

Similarly, when the motor-incorporating roller 5 is rotated, the pinion gears 26a, 26b are rotated, and the horizontal movement members 11 are moved horizontally leftward, as shown in FIG. 8, the four cam followers 36 of the short roller side framework section 18 are dropped off to the second low position sections 8b and the third low position sections 8c serving as the cam recessed parts. As a result, the short roller side framework section 18 is brought down, so that the main conveying conveyor section 3 is lowered. Meanwhile, since the cam followers 27 are placed on the first high position sections 7a and the second high position sections 7b of the horizontal movement members 11, the auxiliary conveying conveyor section 2 remains at the lifted position.

As described above, when the motor-incorporating roller 5 is rotated, the pinion gears 26 are rotated, and the horizontal movement members 11 are moved. Thus, by rotating the motor-incorporating roller 5, the main conveying conveyor section 3 and the auxiliary conveying conveyor section 2 are alternately lifted and lowered.

Figure 1:
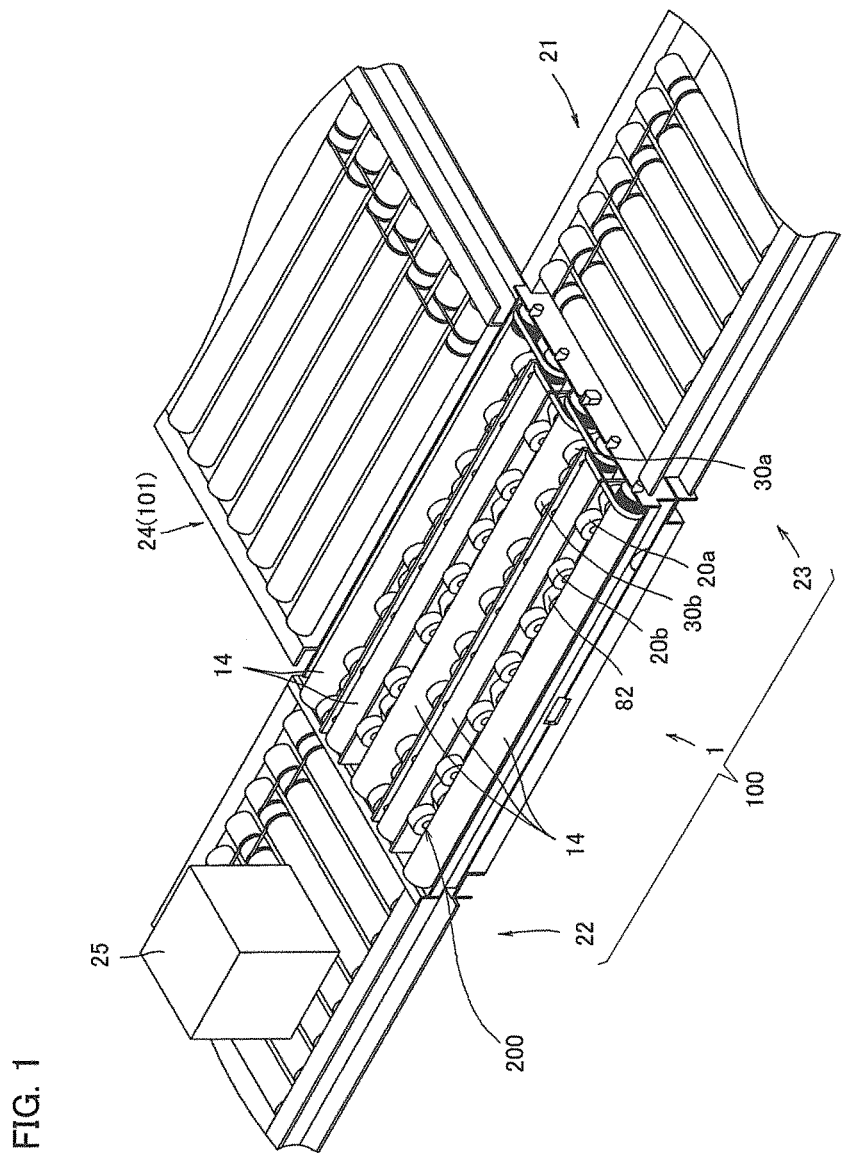
FIG. 1 is a perspective view of a conveyor line including a transfer apparatus of an embodiment of the present invention.
Figure 2:
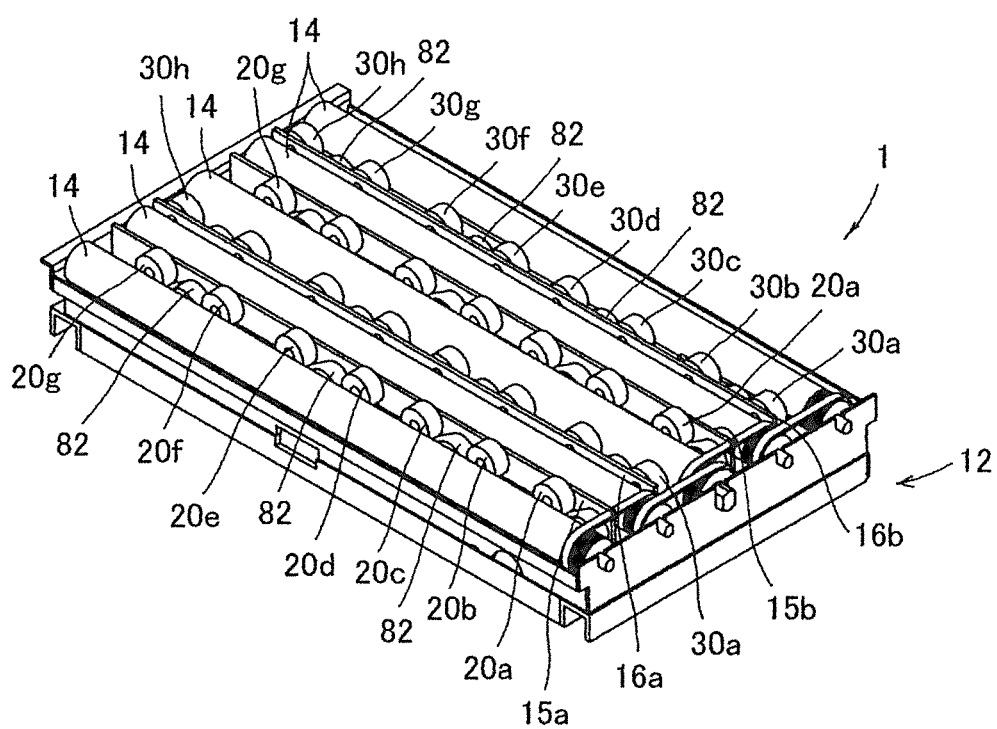
FIG. 2 is a perspective view of a transfer apparatus of an embodiment of the present invention.

The transfer apparatus 1 of the present embodiment has an outer appearance as shown in FIGS. 1, 2 in which both the main conveying conveyor section 3 and the auxiliary conveying conveyor section 2 are unitized and arranged in a main frame 12.

Figure 9A:
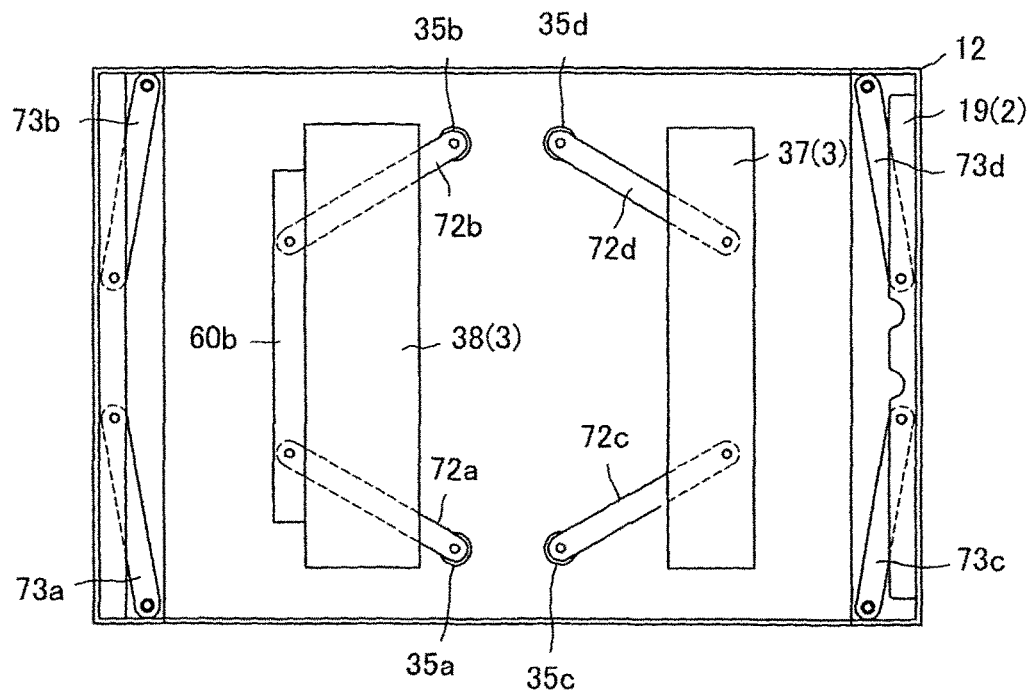
FIGS. 9A to 9C are explanatory diagrams for illustrating a modeled relationship between a main conveying conveyor section and an auxiliary conveying conveyor section, a main frame, and four regulating units.

As shown in FIG. 9A, the main conveying conveyor section 3 and the main frame 12 are combined only by the four regulating units 72a to 72d.

As shown in FIG. 9A, the auxiliary conveying conveyor section 2 and the main frame 12 are also combined only by the four regulating units 73a to 73d.

The regulating units 72, 73 are made by punching thin-plate shape spring steel. That is, the regulating units 72, 73 are elastic thin plates to be warped in the fixed direction. That is, when bending force is applied in the direction perpendicular to a plane, the regulating units 72, 73 are easily warped. However, the regulating units 72, 73 exert strong resistance against force in the twisting direction, so that the regulating units 72, 73 are not easily twisted.

Therefore, the main conveying conveyor section 3 and the auxiliary conveying conveyor section 2 are regulated by actions of the four regulating units 72a to 72d and the four regulating units 73a to 73d to be linearly moved in the direction perpendicular to the main frame 12.

As described above, the main conveying conveyor section 3 and the auxiliary conveying conveyor section 2 have the four cam followers 27 and the four cam followers 36. The four cam followers 27 and the four cam followers 36 are lifted and lowered at the same time by the horizontal movement members 11 serving as direct acting type cams. Therefore, the four cam followers 36 of the main conveying conveyor section 3 are lifted and lowered at the same time by the horizontal movement members 11. Thus, the main conveying conveyor section 3 is lifted and lowered while maintaining a horizontal posture.

The same is applied to the auxiliary conveying conveyor section 2. The four cam followers 27 of the auxiliary conveying conveyor section 2 are lifted and lowered at the same time by the horizontal movement members 11. Thus, the auxiliary conveying conveyor section 2 is lifted and lowered while maintaining a horizontal posture.

Next, the specific configurations of the transfer apparatus 1 of the present embodiment will be described in detail.

As shown in FIG. 1, the transfer apparatus 1 of the present embodiment is arranged in a part of a conveyor line 21 where conveying routes cross each other. That is, the transfer apparatus 1 is arranged between a main conveying line 22 on the upstream side and a main conveying line 23 on the downstream side arranged in a linear form to form a main conveying passage 100, and an auxiliary conveying line 24 orthogonal to the main conveying lines 22, 23 is connected to the transfer apparatus 1.

Therefore, the conveyor line 21 can convey the item 25 along the main conveying passage 100 (main conveying lines 22, 23), and change the conveying direction on the transfer apparatus 1 and convey the item 25 along an auxiliary conveying passage 101 (auxiliary conveying line 24).

As shown in FIG. 3, the transfer apparatus 1 has the main frame 12 in which all the constituent members are accommodated and arranged, the main conveying conveyor section 3 that conveys the item 25 (FIG. 1) to the side of the main conveying line 23 (FIG. 1), and the auxiliary conveying conveyor section 2 that conveys the item 25 to the auxiliary conveying passage 101. As shown in FIG. 3, the transfer apparatus 1 has the lifting and lowering mechanism 4.

The main frame 12 has a bottom wall section 31, long-side side wall sections 32a, 32b, and short-side side wall sections 33a, 33b.

The bottom wall section 31 is a rectangular thin plate. The long-side side wall sections 32a, 32b are provided in end sides on the long-side side of the bottom wall section 31. The short-side side wall sections 33a, 33b are provided in end sides on the short-side side of the bottom wall section 31. The long-side side wall sections 32a, 32b and the short-side side wall sections 33a, 33b are connected to each other to form a frame surrounding four sides. The long-side side wall sections 32a, 32b and the short-side side wall sections 33a, 33b are fixed to be orthogonal to the bottom wall section 31.

In the bottom wall section 31, four guide members 68 are provided along the long-side side wall sections 32a, 32b from the side of ends to the side of center parts of the long-side side wall sections 32a, 32b. Each of the guide members 68 has a floor plate 68a, and a holding member 68b that holds the floor plate 68a down onto the bottom wall section 31. A guide rail (not illustrated) extending along the longitudinal direction of the floor plate 68a is provided in the guide member 68. Leading short rollers 6 run on the floor plate 68a of the guide member 68, so that the horizontal movement member 11 can make reciprocating movement along the guide rail (not illustrated).

As shown in FIG. 3, regulating unit fixing members 28a, 28b are provided on the outer side of the short-side side wall sections 33a, 33b in the main frame 12. Fixing sections 66a, 66b (holes) for fixing one ends of the regulating units 73a, 73b by screwing or the like are provided in the regulating unit fixing member 28a. Similarly, fixing sections 67a, 67b (holes) for fixing one ends of the regulating units 73c, 73d by screwing or the like are provided in the regulating unit fixing member 28b. The other ends of the regulating units 73a to 73d are combined with the long roller side frame 19 of the auxiliary conveying conveyor section 2.

Figure 9B:
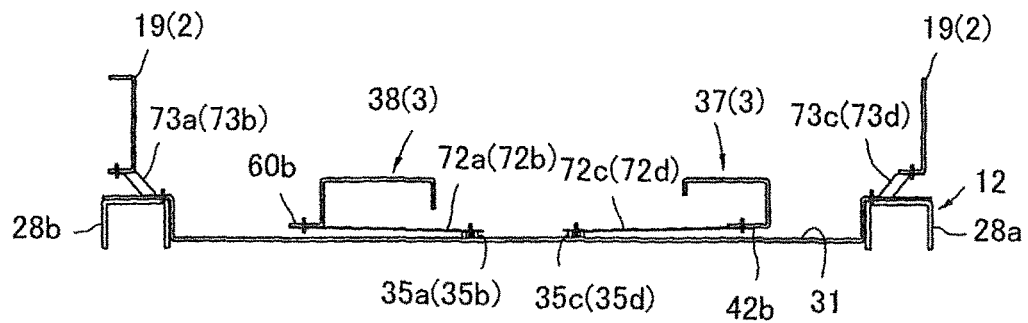
Figure 9C:
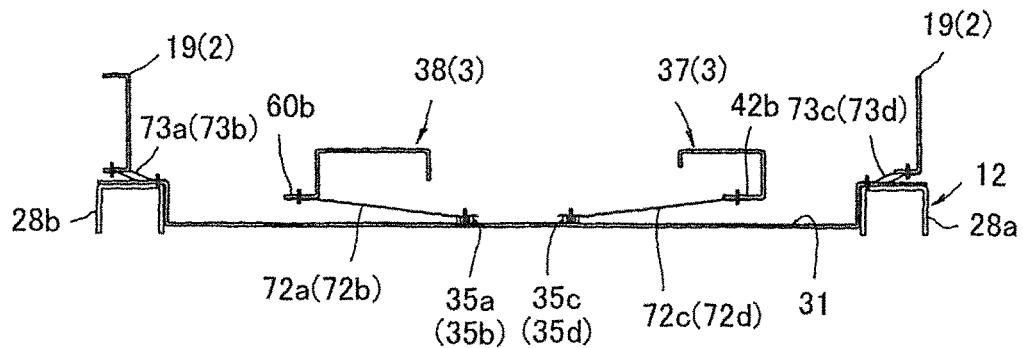

Four tubular fixing sections 35a to 35d (FIG. 4) are provided in the bottom wall section 31. A female screw is formed inside each of the tubular fixing sections. As shown in FIG. 9, one ends of the regulating units 72a to 72d are fixed to the tubular fixing sections 35a to 35d. The other ends of the regulating units 72a to 72d are combined with the support members 37, 38 of the main conveying conveyor section 3.

That is, the tubular fixing sections 35a to 35d (main frame 12) are coupled to the support members 37, 38 (main conveying conveyor section 3) to be described later via the regulating units 72a to 72d.

The lifting and lowering mechanism 4 and the motor-incorporating roller 5 are provided on the bottom wall section 31. As shown in FIGS. 3, 5, the lifting and lowering mechanism 4 has the horizontal movement members 11 and the like.

The motor-incorporating roller 5 has the roller main body 5a, and shafts 34a, 34b. Inside the roller main body 5a, a motor and a reducer (not illustrated) are provided. In both ends of the roller main body 5a, the pinion gears 26a, 26b are provided. The pinion gears 26a, 26b are rotatable integrally with the roller main body 5a.

As shown in FIG. 3, the motor-incorporating roller 5 is arranged in a center part of the bottom wall section 31 in such a posture that the motor-incorporating roller 5 is placed in the short direction of the main frame 12.

The shafts 34a, 34b are non-rotatably supported by bearing sections 29a, 29b (FIG. 3) provided in the main frame 12.

The pinion gears 26a, 26b are engaged with rack teeth 9a of the rack sections 9 of the horizontal movement members 11 to be described later.

As shown in FIGS. 3, 5, 6, each of the horizontal movement members 11 is a long member formed in a substantially cuboid shape. A cross section of the horizontal movement member 11 is substantially rectangle, and the horizontal movement member 11 is arranged in the main frame 12 in such a posture that the longitudinal direction of the rectangle cross section matches with the up and down direction. The rack section 9 is provided in the center part of the upper surface 11a of the horizontal movement member 11. The rack teeth 9a are formed on the rack section 9 by a proper means such as gear cutting. That is, the rack teeth 9a of the rack section 9 are formed to face the upper side.

On a side surface of the horizontal movement member 11, two shafts 10 are provided to pass through two points of the horizontal movement member 11 in the longitudinal direction. The shafts 10 are arranged on both sides of the rack section 9 one by one. The pair of leading short rollers 6 is attached to each of the shafts 10.

As shown in FIGS. 6, 7, 8, the upper surface 11a of the horizontal movement member 11 has the plurality of parts having different heights from each other. That is, on the upper surface 11a of the horizontal movement member 11, in order from one end, the first low position section 8a, the first high position section 7a, the second low position section 8b, the second high position section 7b, and the third low position section 8c are formed. The first low position section 8a and the third low position section 8c are formed in both ends of the horizontal movement member 11. The above rack section 9 is provided in the middle part of the second low position section 8b in the center part of this upper surface 11a.

As shown in FIG. 3, the leading short rollers 6 are arranged on the floor plate 68a of the guide member 68. That is, the pair of leading short rollers 6 can make reciprocating movement on the floor plate 68a along the guide rail (not illustrated).

The rack teeth 9a of the rack sections 9 are engaged with the pinion gears 26a, 26b fixed to the roller main body 5a of the motor-incorporating roller 5. Therefore, when the motor-incorporating roller 5 is driven, the horizontal movement members 11 are moved along the longitudinal direction of the main frame 12.

Figure 6C:
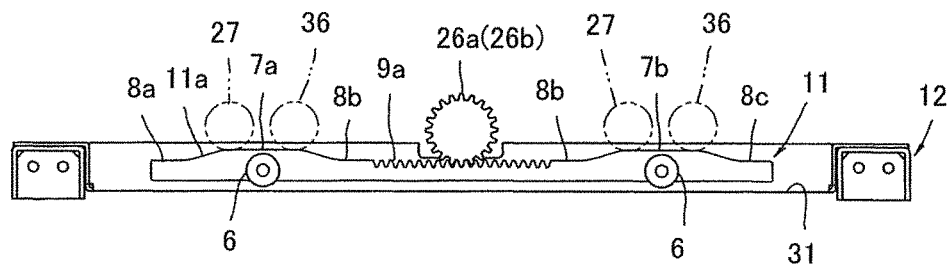

FIG. 6C shows a state where the pinion gear 26a (26b) is engaged with a center part of the rack section 9 of the horizontal movement member 11. When the pinion gear 26a is rotated anti-clockwise seen in FIG. 6C, the horizontal movement member 11 is moved rightward as shown in FIG. 7C. When the pinion gear 26a is rotated clockwise, the horizontal movement member 11 is moved leftward as shown in FIG. 8C.

As shown in FIG. 10, the main conveying conveyor section 3 is formed by the fixing members 15a, 16a, 15b, 16b, the support members 37, 38, the pulleys 17a to 17g, the short rollers 20a to 20g, the short rollers 30a to 30h, the belt drive roller 80, the belts 82, and the like.

Figure 12:
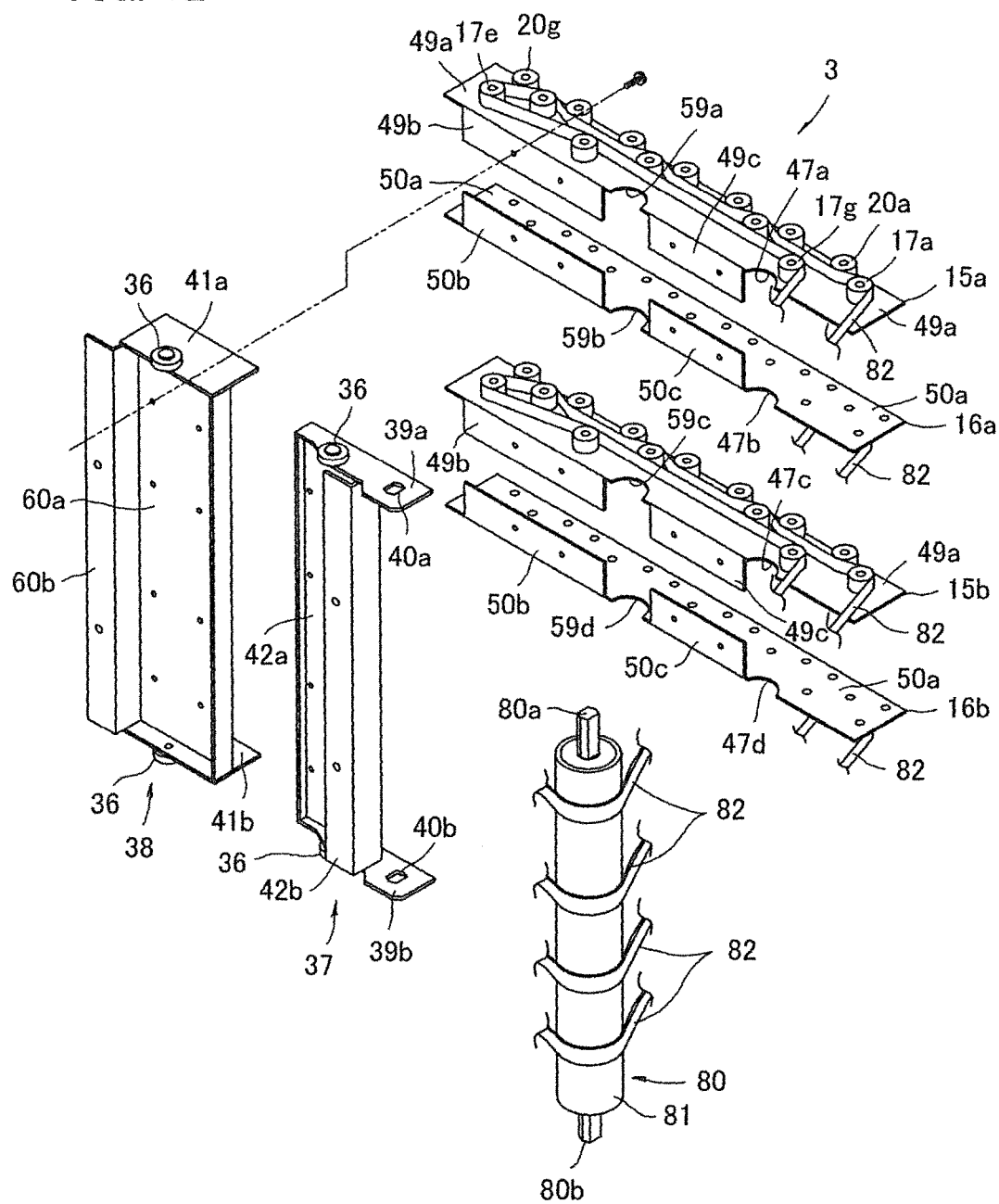
FIG. 12 is an exploded perspective view of the main conveying conveyor section of FIG. 10 seen from the lower side.

As shown in FIG. 12, each of the fixing members 15a, 15b is a member formed by partly bending a flat plate into an L shape. Each of the fixing members 15a, 15b has a vertical section (wall shape member) 49a and horizontal sections 49b, 49c. The horizontal sections 49b, 49c are provided on the lower side of the vertical section 49a. The horizontal sections 49b, 49c are continuous to a lower part of the vertical section 49a, and bent in the same direction with respect to the vertical section 49a.

The vertical section 49a is attached to the support members 37, 38 and stand in a wall form.

The pulleys 17a to 17g and the seven short rollers 20a to 20g are rotatably and axially fixed to the vertical section 49a.

That is, as shown in FIG. 10, support holes rotatably supporting the pulleys 17a to 17g and the seven short rollers 20a to 20g are provided in the vertical section 49a.

The pulleys 17a to 17g are arranged and divided in the longitudinal direction of the vertical section 49a.

As shown in FIG. 10, attachment heights of the pulleys 17a, 17b, 17c, 17d are the same height on the relatively upper side, and attachment heights of the pulleys 17e, 17f, 17g are the same height on the relatively lower side. That is, the pulleys 17a, 17b, 17c, 17d are arranged at positions higher than the pulleys 17e, 17f, 17g.

The seven short rollers 20a to 20g are arranged and divided in the longitudinal direction of the vertical section 49a.

The short rollers 20a, 20b are arranged in a part between the pulley 17a and the pulley 17b in the longitudinal direction of the vertical section 49a. The short rollers 20c, 20d are arranged in a part between the pulley 17b and the pulley 17c. The short rollers 20e, 20f are arranged in a part between the pulley 17c and the pulley 17d. The short roller 20g is arranged in a part between the pulley 17d and the pulley 17e.

Heights of the short rollers 20a to 20g match with each other, and upper parts of the short rollers 20a to 20g protrude to the upper side of the vertical section 49a. By these upper parts (top parts) of the short rollers 20a to 20g, a conveying surface is formed.

A recessed section 59a or 59c (FIG. 12) is respectively provided in a part between the horizontal section 49b and the horizontal section 49c in the lower part of the vertical section 49a of each of the fixing members 15a, 15b.

Each of the fixing members 16a, 16b also has a vertical section 50a and horizontal sections 50b, 50c as well as the vertical section 49a and the horizontal sections 49b, 49c of each of the fixing members 15a, 15b.

The pulleys 77a to 77h and the seven short rollers 30a to 30h are rotatably and axially fixed to the vertical section 50a.

That is, as shown in FIG. 14, support holes rotatably supporting the pulleys 77a to 77h and the eight short rollers 30a to 30h are provided in the vertical section 50a. The pulleys 77a to 77h and the eight short rollers 30a to 30h are arranged and divided in the longitudinal direction of the vertical section 50a.

Figure 15A:
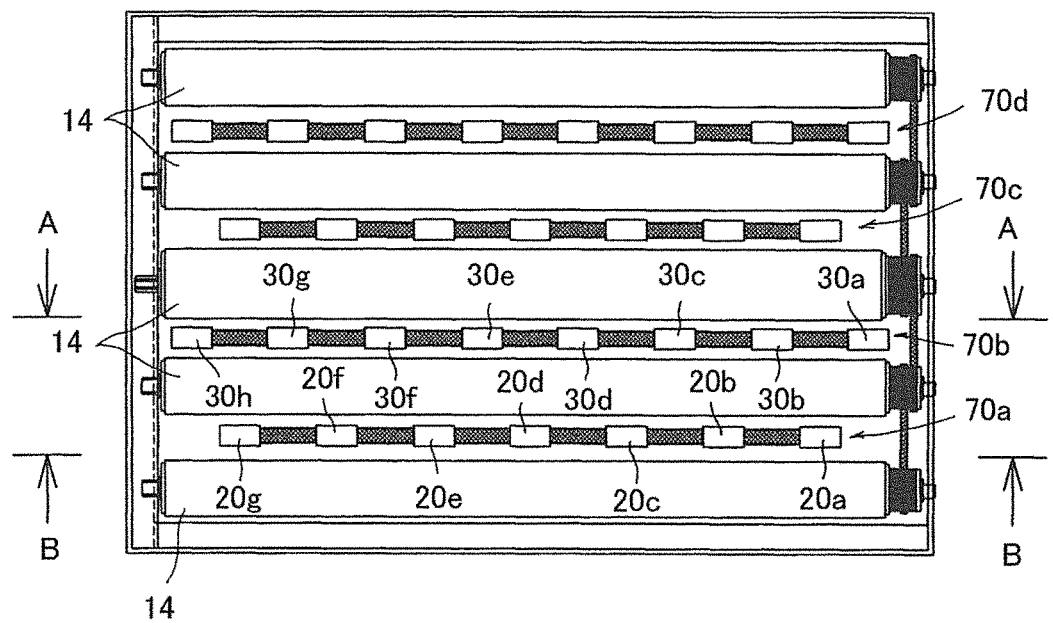
FIG. 15A is a plan view of the transfer apparatus of FIG. 2.

As shown in FIG. 15A, attachment positions of the short rollers 30a to 30h in the longitudinal direction of the fixing members 16a, 16b are positions where the short rollers 30a to 30h and the short rollers 20a to 20g on the side of the fixing members 15a, 15b are set in a zig-zag form at the time of lining up ends of the fixing members 15a, 15b and the fixing members 16a, 16b. That is, the short roller 20a of the fixing member 15a is arranged between the short rollers 30a, 30b in the longitudinal direction of the fixing member 16a. Hereinafter, in order, the short rollers 20b to 20g and the short rollers 30b to 30h are alternately arranged in the longitudinal direction of the fixing members 15a, 16a.

When the main conveying conveyor section 3 and the auxiliary conveying conveyor section 2 are arranged in the main frame 12, the longitudinal direction of the fixing members 15a, 16a, 15b, 16b matches with the longitudinal direction of the conveying rollers 14 (long rollers) of the auxiliary conveying conveyor section 2 to be described later. That is, the short rollers 20a to 20g and 30a to 30h are arranged along the longitudinal direction of the conveying rollers 14.

In the fixing members 16a, 16b, the pulleys 77a to 77h are arranged so that the short rollers 30a to 30h are arranged as described above.

The fixing members 15a, 16a, 15b, 16b are arranged at intervals in this order so that the vertical sections are parallel to each other.

The horizontal sections 49b, 49c, 50b, 50c of the fixing members 15a, 16a, 15b, 16b are fixed to the support members 37, 38 to be described later by screwing or the like.

Figure 11:
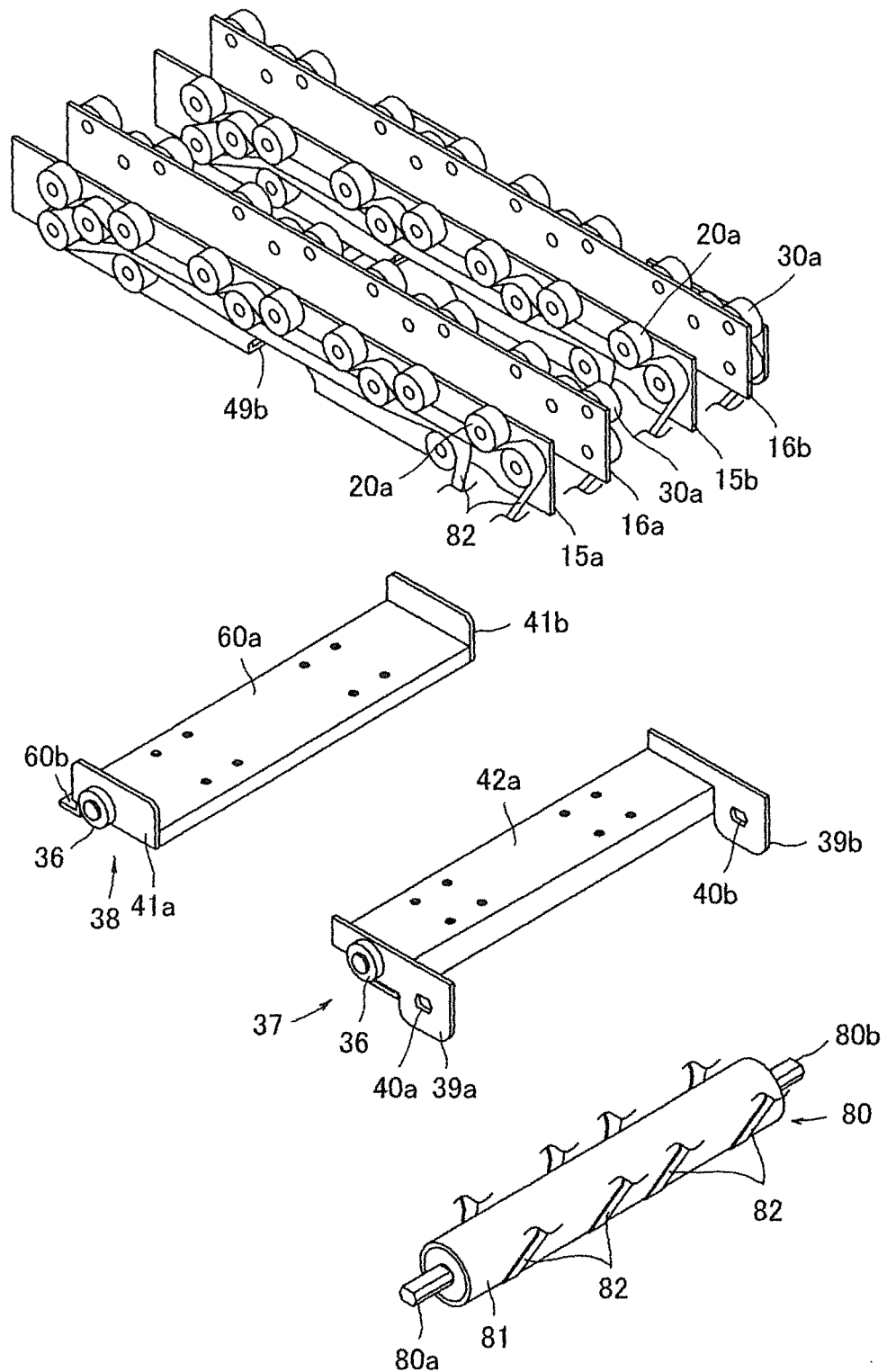
FIG. 11 is an exploded perspective view of the main conveying conveyor section of FIG. 10.
Figure 16:
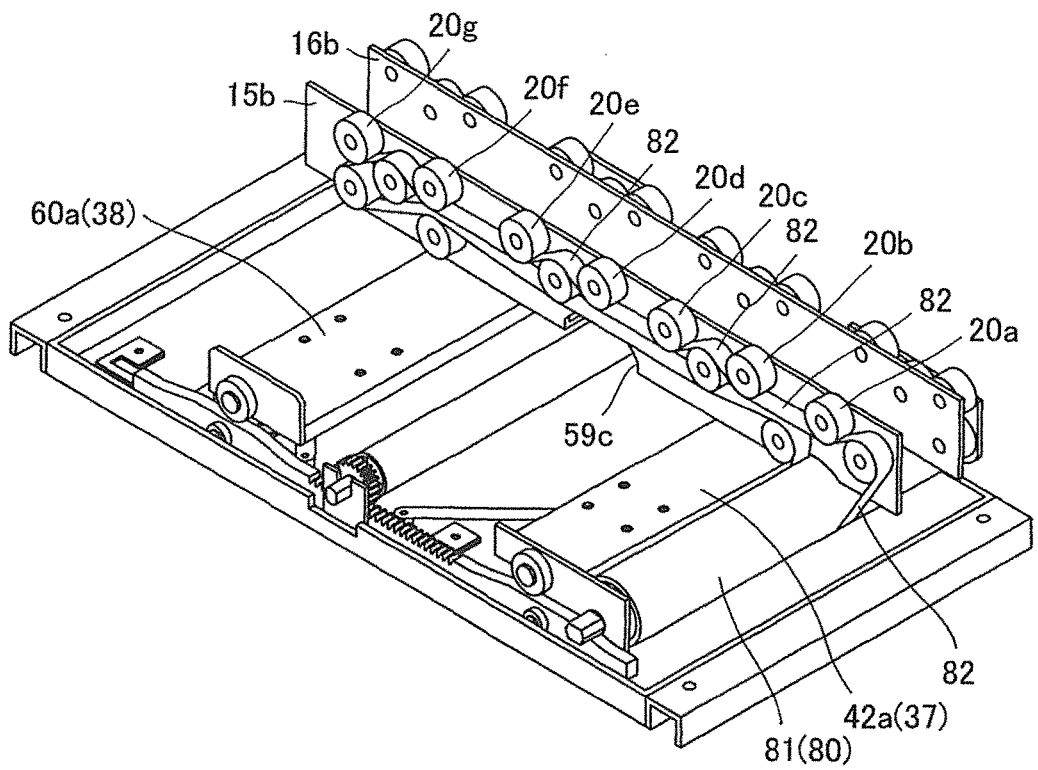
FIG. 16 is a perspective view of a state where the main conveying conveyor section and a lifting and lowering unit are arranged in a main frame while a part of the main conveying conveyor section is omitted.

As shown in FIGS. 11, 12, the support members 37, 38 are members formed in a substantially cuboid shape. The support member 37 has such a structure that both sides of an rectangular flat plate on the long-side side are bent at right angle in the same direction, and one of the sides is further bent at right angle to face the other side. That is, the support member 37 is formed in a substantially box shape having an upper surface section 42a (FIGS. 11, 16) and a lower surface section 42b (FIG. 12).

The horizontal sections 49c, 50c of the fixing members 15a, 16a, 15b, 16b are fixed to the upper surface section 42a by a fixing means such as screwing and welding. The other ends of the regulating units 72c, 72d whose one ends are fixed to the main frame 12 are fixed to the lower surface section 42b.

The flat-plate-shape flange sections 39a, 39b are fixed to both ends of the support member 37 on the short-side side by welding or the like.

Through holes 40a, 40b through which the shafts 80a, 80b of the belt drive roller 80 pass are provided in the flange sections 39a, 39b. A cross section of the shafts 80a, 80b is formed in not a circular shape but for example a hexagonal shape or the like. The through holes 40a, 40b are formed in a similar shape to an outer shape of the shafts 80a, 80b, and have such size and hole shape that the shafts 80a, 80b can be exactly inserted.

Support holes (not illustrated) for rotatably installing the cam followers 36 are provided in the flange sections 39a, 39b. That is, the cam followers 36 are respectively attached to the flange sections 39a, 39b. The cam follower 36 installed in the flange section 39a and the cam follower 36 installed in the flange section 39b are arranged at positions at the same height.

The support member 38 has a structure formed by bending a rectangular plate member same as the support member 37. The support member 38 has an upper surface section 60a (FIG. 11) and a lower surface section 60b (FIG. 12). There is no problem in the same structure as the support member 37 for the support member 38. However, in the present embodiment shown in FIG. 12, the support member 38 has a structure where the lower surface section 60b expands outward.

Flange sections 41a, 41b are provided in both longitudinal ends of the support member 38. Holes (not illustrated) for rotatably installing the cam followers 36 are provided in the flange sections 41a, 41b. That is, the cam followers 36 are respectively attached to the flange sections 41a, 41b. The cam followers 36 installed in the flange sections 41a, 41b are arranged at positions having the same height.

The horizontal sections 49b, 50b of the fixing members 15a, 16a, 15b, 16b are fixed to the upper surface section 60a of the support member 38 by a fixing means such as screwing and welding. The other ends of the regulating units 72a, 72b whose one ends are fixed to the main frame 12 are fixed to the lower surface section 60b of the support member 38.

The support members 37, 38 are arranged and spaced from each other in the longitudinal direction of the fixing members 15a, 16a, 15b, 16b in a state where the longitudinal direction of the support members 37, 38 is orthogonal to the fixing members 15a, 16a, 15b, 16b.

The horizontal sections 49b, 49c, 50b, 50c of the fixing members 15a, 16a, 15b, 16b are fixed to the support members 37, 38 by a fixing means such as screwing. That is, the fixing members 15a, 16a, 15b, 16b and the support members 37, 38 are integrated to be one unit, and the fixing members 15a, 16a, 15b, 16b stand on the support members 37, 38.

The cam followers 36 installed in the flange sections 39a, 39b on the side of the support member 37 are placed at positions at the same height as the cam followers 36 installed in the flange sections 41a, 41b on the side of the support member 38.

The belt drive roller 80 is a motor-incorporating roller having a roller main body 81 and the shafts 80a, 80b. The cross section of the shafts 80a, 80b is formed in not a circular shape but for example a hexagonal shape or the like. The through holes 40a, 40b provided in the flange sections 39a, 39b are formed in a similar shape to the outer shape of the shafts 80a, 80b, and have such size and hole shape that the shafts 80a, 80b can be exactly inserted. Therefore, even when the belt drive roller 80 is driven, the shafts 80a, 80b passing through the through holes 40a, 40b are not rotated relatively to the flange sections 39a, 39b. The roller main body 81 is rotated about the shafts 80a, 80b when the belt drive roller 80 is driven.

The belt drive roller 80 is orthogonal to the fixing members 15a, 16a, 15b, 16b and is arranged on the lower side of the fixing members 15a, 16a, 15b, 16b. The roller main body 81 of the belt drive roller 80 comes into arc shape recessed sections 47a to 47d provided in the fixing members 15a, 16a, 15b, 16b. Therefore, size in the height direction including the fixing members 15a, 16a, 15b, 16b and the belt drive roller 80 is slightly reduced.

The belt drive roller 80 is arranged at a position lower than the pulleys 17e, 17f, 17g.

The belt 82 (annular member) is suspended on the pulleys 17a to 17g of each of the fixing members 15a, 15b and the belt drive roller 80 and has an inner circumference and an outer circumference. The pulleys 17a to 17d and the belt drive roller 80 are arranged inside the annular belt 82, and the pulleys 17f, 17g are arranged in a lower part outside the belt 82. In the present embodiment, the belts 82 provided in the fixing members 15a, 15b are driven by one belt drive roller 80.

As shown in FIG. 10, the short rollers 20a to 20g press the upper surface of the belt 82 on the conveying passage side (upper side). Any of the pulleys 17a to 17g functions as a tension member and predetermined tensile force is applied to the belt 82. The outer circumference of the belt 82 is engaged with and always closely attached to the part of the circumferential surface of each of the short rollers 20a to 20g within the predetermined angle range. That is, the belt 82 (annular member) is arranged along the pulleys 17a to 17g and the short rollers 20a to 20g. As shown in FIG. 13 and the like, the short rollers 20a to 20g protrude to the upper side of the belt 82.

Similarly, the belt 82 (annular member) is also suspended on the pulleys 77a to 77h of each of the fixing members 16a, 16b and the belt drive roller 80. As shown in FIG. 10, the short rollers 30a to 30h press the upper surface of the belt 82 on the conveying passage side (upper side). Any of the pulleys 77a to 77h functions as a tension member and predetermined tensile force is applied to the belt 82. The belt 82 is always closely attached to the part of the circumferential surface of each of the short rollers 30a to 30h within the predetermined angle range. That is, the belt 82 is arranged along the pulleys 77a to 77h and the short rollers 30a to 30h. As shown in FIG. 14 and the like, the short rollers 30a to 30h protrude to the upper side of the belt 82.

Figure 15B:
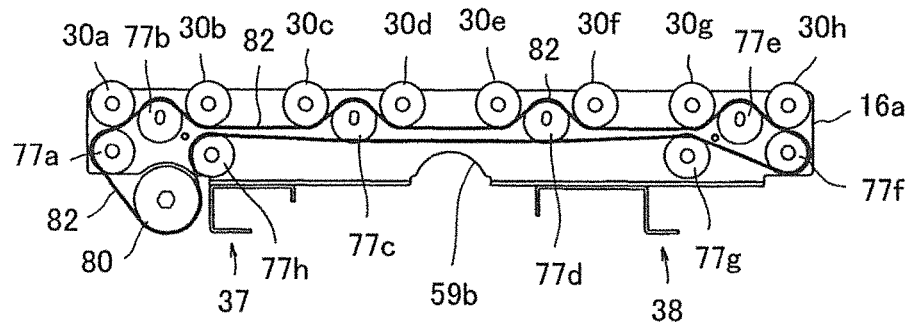
FIG. 15B is a sectional view taken along the line A-A of FIG. 15A.
Figure 15C:
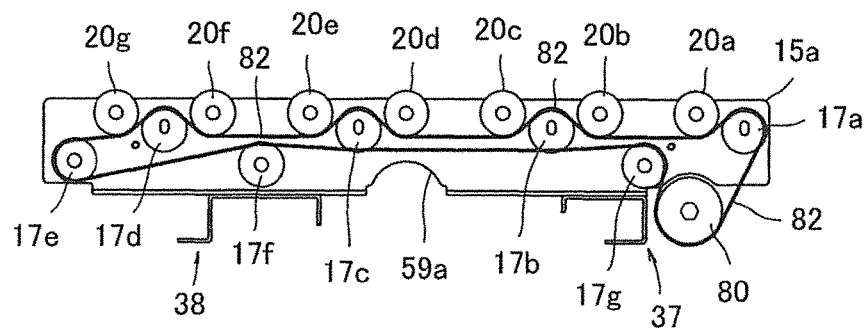
FIG. 15C is a sectional view taken along the line B-B of FIG. 15A.

As in FIGS. 15B, 15C, the belts 82 (annular members) are engaged with all the pulleys 17a to 17g, 77a to 77h and all the short rollers 20a to 20g, 30a to 30h. Suspension routes of the belts 82 (annular members) are complicated as in FIGS. 15B, 15C. That is, in the belts 82, the running direction is changed in parts where the belts are engaged with the pulleys 17a to 17g, 77a to 77h and the short rollers 20a to 20g, 30a to 30h, so that corner parts are formed.

The short rollers 20b to 20f, 30b to 30g excluding the short rollers arranged in both ends are placed at positions to change running routes of the belts 82 by 30 degrees or more. Therefore, an angle range where the short rollers 20b to 20f, 30b to 30g are brought into contact with the belts 82 is 30 degrees or more, so that running force of the belts 82 can be efficiently transmitted.

Figure 17:
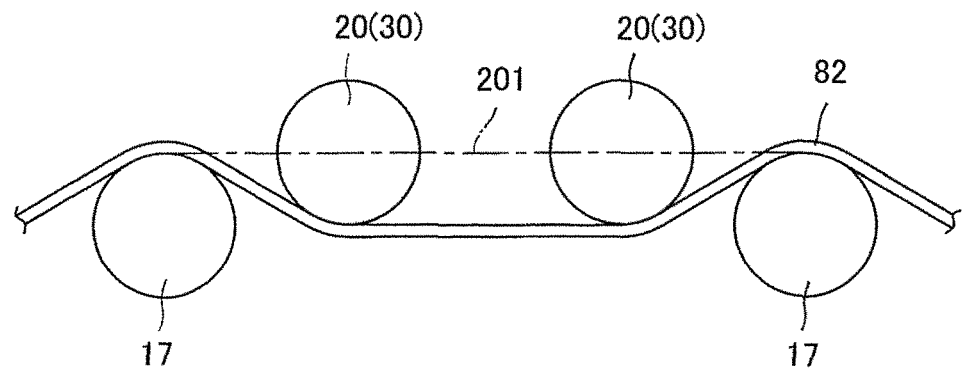
FIG. 17 is an explanatory diagram for illustrating a positional relationship between pulleys of a main conveying conveyor section and short rollers.

As described above, the short rollers 20a to 20g, 30a to 30h are placed at position to press the upper surfaces of the belts 82 on the conveying passage side (upper side). That is, as in FIG. 17, any of the short rollers is placed between two pulleys, and each of the short rollers 20a to 20g, 30a to 30h is arranged at a position getting across a tangent line 201 shared by the two pulleys.

Therefore, the running force of the belts 82 can be efficiently transmitted to the short rollers 20a to 20g, 30a to 30h.

A friction member of rubber or the like is preferably provided on the circumferential surface of each of the short rollers 20a to 20g, 30a to 30h. In addition to the belt, for example, a chain, a string, or the like can be adopted as the annular member.

The auxiliary conveying conveyor section 2 (FIG. 3) has the long roller side frame 19 and a long roller conveyor main body 13. The long roller conveyor main body 13 is arranged on the long roller side frame 19. In the long roller conveyor main body 13, as described above, at least one of the plurality of conveying rollers 14 (long rollers) is the drive roller, and the other conveying rollers are the follower rollers. Mechanical power is transmitted between the drive roller and the follower rollers by the belts. The conveying rollers 14 are axially supported by two facing short-side side wall sections 52a, 52b (to be described later).

The long roller side frame 19 has two long-side side wall sections 51a, 51b and the two short-side side wall sections 52a, 52b. The long-side side wall sections 51a, 51b have the same structure but are formed to be left-right symmetrical. Hereinafter, the long-side side wall section 51a will be mainly described, and duplicated description for the long-side side wall section 51b will be omitted.

The long roller side frame 19 is a frame shape member formed by the long-side side wall sections 51a, 51b and the short-side side wall sections 52a, 52b. The long roller side frame 19 can accommodate the main conveying conveyor section 3 inside.

The long-side side wall section 51a is formed by a long and flat plate shape member. An upper side of the long-side side wall section 51a is bent at right angle to form a flange shape. Follower fixing holes 54a are provided at two points of the long-side side wall section 51a. The follower fixing holes 54a are holes for rotatably and axially supporting the cam followers 27 (depicted in the long-side side wall section 51a). The two cam followers 27 are arranged at predetermined intervals in the longitudinal direction of the long-side side wall section 51*a*, and both the cam followers 27 are provided in parts displaced from center of the long-side side wall section 51*a*.

The cam followers 27 are arranged inside a frame of the long roller side frame 19.

A planar shape of the transfer apparatus 1 in a state where the above members are assembled is as shown in FIG. 15A. That is, as shown in FIG. 15A, short roller rows 70*a* to 70*d* including the short rollers 20*a* to 20*g*, 30*a* to 30*h* of the main conveying conveyor section 3 are arranged between the conveying rollers 14 (long rollers) of the auxiliary conveying conveyor section 2.

That is, the main conveying conveyor section 3 is the collective body of the belts 82 attached to the fixing members 15*a*, 16*a*, 15*b*, 16*b*, and the narrow conveyors 200 formed by the pulleys 17*a* to 17*g*, 77*a* to 77*h* and the short rollers 20*a* to 20*g*, 30*a* to 30*h*. Each of the narrow conveyors 200 is arranged between the conveying rollers 14 of the auxiliary conveying conveyor section 2.

Next, actions of the transfer apparatus 1 will be described.

At the time of setting the conveying direction of the item 25 shown in FIG. 1, the transfer apparatus 1 is actuated as follows.

In a case where the item 25 is conveyed from the upstream side main conveying line 22 to the downstream side main conveying line 23, the main conveying conveyor section 3 of the transfer apparatus 1 is lifted, the short rollers 20*a* to 20*g*, 30*a* to 30*h* (short roller rows) are arranged on the conveying passage, the auxiliary conveying conveyor section 2 is lowered, and the conveying rollers 14 are retreated to the lower side of the conveying passage.

That is, the motor-incorporating roller 5 is driven, the horizontal movement members 11 are moved rightward as shown in FIG. 7C, the cam followers 36 of the main conveying conveyor section 3 are arranged on the first high position sections 7*a* and the second high position sections 7*b*, and the cam followers 27 of the auxiliary conveying conveyor section 2 are arranged on the first low position sections 8*a* (cam recessed parts) and the second low position sections 8*b* (cam recessed parts). As a result, the main conveying conveyor section 3 is moved to the lifted position, and the auxiliary conveying conveyor section 2 is moved to the lowered position. The short rollers 20*a* to 20*g*, 30*a* to 30*h* (short roller rows) to which mechanical power is transmitted by the belts 82 are arranged on the conveying surface, and the item 25 is conveyed to the side of the downstream side main conveying line 23 by the main conveying conveyor section 3 of the transfer apparatus 1.

Figure 7A:
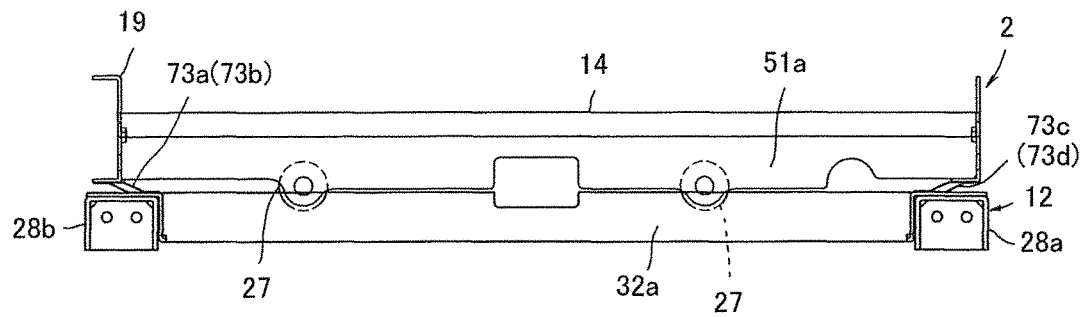
FIGS. 7A to 7C are explanatory diagrams showing relationships between conveying conveyor sections and a horizontal movement member in a case where a main conveying conveyor section is placed at a lifted position and an auxiliary conveying conveyor section is placed at a lowered position.
Figure 7B:
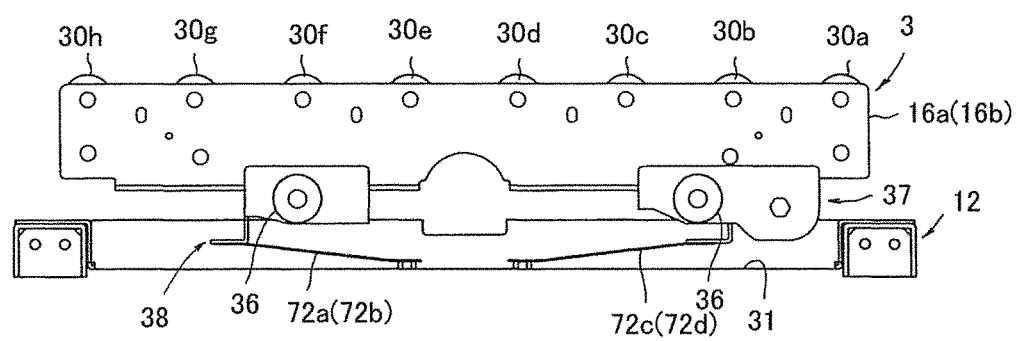
Figure 7C:
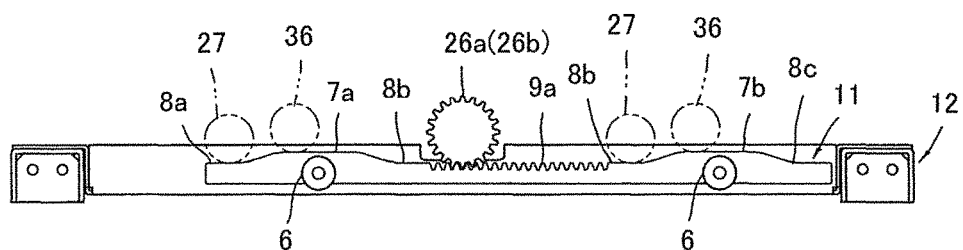

At this time, the regulating units 72, 73 guide the main conveying conveyor section 3 and the auxiliary conveying conveyor section 2 so that the conveying conveyor sections are moved in the vertical direction as shown in FIGS. 7A, 7B.

In a case where the item 25 is conveyed from the upstream side main conveying line 22 to the side of the auxiliary conveying line 24, the auxiliary conveying conveyor section 2 of the transfer apparatus 1 is lifted, the conveying rollers 14 are arranged on the conveying passage, the main conveying conveyor section 3 is lowered, and the short rollers 20*a* to 20*g*, 30*a* to 30*h* (short roller rows) are retreated to the lower side of the conveying passage.

That is, the motor-incorporating roller 5 is driven, the horizontal movement members 11 are moved leftward as shown in FIG. 8C, the cam followers 36 of the main conveying conveyor section 3 are arranged on the second low position sections 8*b* (cam recessed parts) and the third low position sections 8*c* (cam recessed parts), and the cam followers 27 of the auxiliary conveying conveyor section 2 are arranged on the first high position sections 7*a* and the second high position sections 7*b*. As a result, the main conveying conveyor section 3 is moved to the lowered position, and the auxiliary conveying conveyor section 2 is moved to the lifted position. The conveying rollers 14 are arranged on the conveying surface, and the item 25 is conveyed to the side of the auxiliary conveying line 24 by the auxiliary conveying conveyor section 2 of the transfer apparatus 1.

Figure 8A:
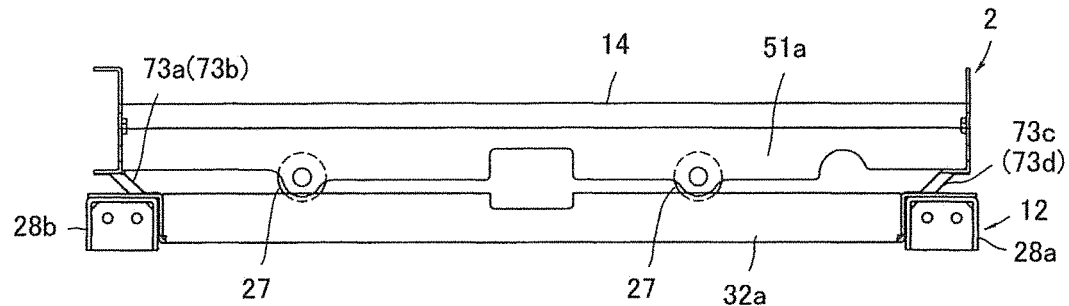
FIGS. 8A to 8C are explanatory diagrams showing relationships between conveying conveyor sections and a horizontal movement member in a case where a main conveying conveyor section is placed at the lowered position and an auxiliary conveying conveyor section is placed at the lifted position.
Figure 8B:
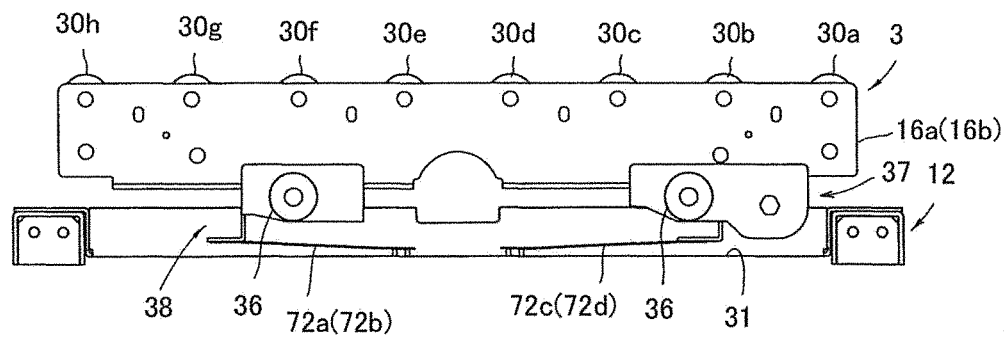
Figure 8C:
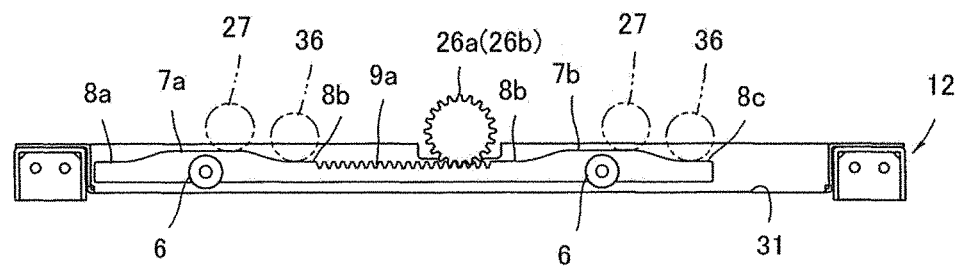

At this time, the regulating units 72, 73 guide the main conveying conveyor section 3 and the auxiliary conveying conveyor section 2 so that the conveying conveyor sections are moved in the vertical direction as shown in FIGS. 8A, 8B.

At the time of conveying the item 25 to the side of the auxiliary conveying passage 101, in the transfer apparatus 1, the auxiliary conveying conveyor section 2 is lifted and the main conveying conveyor section 3 is lowered. At this time, the item 25 is moved in the direction crossing the running direction of the belts 82 on the upper side of the main conveying conveyor section 3. However, the short rollers 20*a* to 20*g*, 30*a* to 30*h* (short roller rows) are arranged on the upper side of the belts 82 in the main conveying conveyor section 3. Therefore, even if a bottom part of the item 25 is brought into contact with the main conveying conveyor section 3, the item 25 is brought into contact with the short rollers 20*a* to 20*g*, 30*a* to 30*h* (short rollers) placed on the upper side of the belts 82 but not into contact with the belts 82. Thus, the belts 82 are not detached upon receiving external force from the item 25.

The short rollers 20*a* to 20*g*, 30*a* to 30*h* are fixed on the rotation axes. Thus, the short rollers can bear even upon receiving external force not only in the conveying direction but also in the direction crossing the conveying direction. Therefore, a posture and a state of the short rollers 20*a* to 20*g*, 30*a* to 30*h* are not changed.

As shown in FIG. 15A, in the short roller rows of the main conveying conveyor section 3, the short rollers 20*a* to 20*g* and the short rollers 30*a* to 30*h* may be alternately arranged in a zig-zag form. However, in the short roller rows, the short rollers may be arranged at the same intervals along the longitudinal direction of the conveying rollers 14 (long rollers). That is, only short roller rows including the short rollers 20*a* to 20*g* may be adopted or only short roller rows including the short rollers 30*a* to 30*h* may be adopted.

The invention claimed is:

1. A transfer apparatus comprising:
   a frame;
   a main conveying conveyor section that has a main conveying passage placed in a fixed planar region for conveying a conveyed item in a fixed direction;
   an auxiliary conveying conveyor section that has an auxiliary conveying passage arranged in the same planar region as the main conveying passage for conveying the conveyed item in the direction crossing the conveying direction of the main conveying passage; and
   a lifting and lowering unit that lifts and lowers at least one of the main conveying conveyor section and the auxiliary conveying conveyor section so as to lift one of the conveying passages to the upper side of the other conveying passage and to convey the conveyed item in the desired direction,
   wherein one of the main conveying conveyor section and the auxiliary conveying conveyor section is a roller conveyor device in which a plurality of long rollers are arranged in parallel, whereas the other conveying conveyor section is a short roller conveyor device in which a plurality of short roller rows are arranged in parallel, wherein each of the short roller rows has a plurality of short rollers arranged along the longitudinal direction of the long rollers with rotation axes thereof placed in the direction crossing rotation axes of the long rollers, and wherein the short roller conveyor device comprises:
- a plurality of annular members arranged along the row of the short rollers so as to transmit mechanical power to the short rollers rotating in accordance with running of the annular members by contacting with the short rollers directly or indirectly,
- the annular members each having an inner circumference and an outer circumference; and
- a power source that runs the annular members,
- wherein the mechanical power is transmitted to the short rollers by making the short rollers contact the outer circumference of one of the annular members.

2. The transfer apparatus of claim 1, wherein upper parts of the short rollers protrude to an upper side of the annular member.

3. The transfer apparatus of claim 1,
wherein the short roller conveyor device has a plurality of pulleys,
wherein the annular members are belts and engaged with the pulleys and the short rollers,
wherein a suspension route of each of the annular members is complicated and has a plurality of corners, and
wherein any of the short rollers or all the short rollers are located in places to form the corner.

4. The transfer apparatus of claim 1,
wherein the short roller conveyor device has a plurality of pulleys,
wherein the annular members are belts to be engaged with the plurality of pulleys,
wherein each of the short rollers is arranged between an adjacent two of the plurality of pulleys, and
wherein the short rollers are arranged at positions getting across a tangent line shared by the two adjacent pulleys.

5. The transfer apparatus of claim 1,
wherein the short roller conveyor device has a wall shape member, and
wherein a plurality of the short rollers are rotatably and axially fixed to the wall shape member.

6. The transfer apparatus of claim 1, wherein the short roller conveyor device has a wall shape member and a plurality of pulleys,
wherein a plurality of the short rollers and a plurality of the pulleys are rotatably and axially fixed to the wall shape member, and
wherein the annular member is suspended on the pulleys.

7. The transfer apparatus of claim 1,
wherein the short roller conveyor device has a plurality of wall shape members,
wherein a plurality of pulleys, a plurality of the short rollers, and the annular member are attached to each of the wall shape members to form he narrow conveyor including the short roller row,
wherein the wall shape members are supported by a support member and stand at fixed intervals in parallel, and
wherein each of the wall shape members is arranged between the rollers of the roller conveyor device.

8. The transfer apparatus of claim 1,
wherein the power source of the short roller conveyor device is a long drive roller, and
wherein one of the drive rollers is engaged with a plurality of the annular members.

9. The transfer apparatus of claim 1, wherein a friction member is provided on an outer circumference of the short roller.

10. The transfer apparatus of claim 1, wherein the annular member is engaged with a part of a circumferential surface of the short roller within a predetermined angle range.

11. The transfer apparatus of claim 1, wherein the short rollers of each of the short roller rows are arranged at positions different from the short rollers of the adjacent short roller row in the longitudinal direction of the long rollers.

12. The transfer apparatus of claim 1,
wherein the lifting and lowering unit has a motor, and a lifting and lowering mechanism formed by combining a plurality of members, and
wherein the lifting and lowering mechanism has a pinion gear, a rack, a cam section to be linearly moved by the rack, and a cam follower provided in the main conveying conveyor section or the auxiliary conveying conveyor section.

13. The transfer apparatus of claim 1, further comprising a regulating unit that regulates at least one of the main conveying conveyor section and the auxiliary conveying conveyor section to be linearly lifted and lowered,
the regulating unit being a warping plate body, and being attached between the frame and the main conveying conveyor section or the auxiliary conveying conveyor section in such a posture that the warping direction of the regulating unit matches with the direction in which the main conveying conveyor section or the auxiliary conveying conveyor section is lifted and lowered.

14. A transfer apparatus comprising:
a frame;
a main conveying conveyor section that has a main conveying passage placed in a fixed planar region for conveying a conveyed item in a fixed direction;
an auxiliary conveying conveyor section that has an auxiliary conveying passage arranged in the same planar region as the main conveying passage for conveying the conveyed item in the direction crossing the conveying direction of the main conveying passage; and
a lifting and lowering unit that lifts and lowers at least one of the main conveying conveyor section and the auxiliary conveying conveyor section so as to lift one of the conveying passages to the upper side of the other conveying passage and to convey the conveyed item in the desired direction,
wherein one of the main conveying conveyor section and the auxiliary conveying conveyor section is a wide conveyor device in which a plurality of long rotation members having predetermined length is arranged in parallel, whereas the other conveying conveyor section is a short roller conveyor device in which a plurality of short roller rows are arranged in parallel,
wherein each of the short roller rows has a plurality of short rollers arranged along the longitudinal direction of the long rollers with rotation axes thereof placed in the direction crossing rotation axes of the long rollers, wherein the short roller conveyor device comprises:
a plurality of annular members arranged along the row of the short rollers so as to transmit mechanical power to the short rollers rotating in accordance with running of the annular members by contacting with the short rollers directly or indirectly,
the annular members each having an inner circumference and an outer circumference; and
a power source that runs the annular members,
wherein the mechanical power is transmitted to the short rollers by making the short rollers contact the outer circumference of one of the annular members,
wherein the short roller conveyor device has a plurality of pulleys,
wherein the annular members are belts and engaged with the pulleys and the short rollers,
wherein a suspension route of each of the annular members is complicated and has a plurality of corners, and
wherein any of the short rollers or all the short rollers are located in places to form the corner.

15. The transfer apparatus of claim 14,
wherein the short roller conveyor device has a plurality of pulleys,
wherein the annular members are belts to be engaged with the plurality of pulleys,
wherein each of the short rollers is arranged between an adjacent two of the plurality of pulleys, and
wherein the short rollers are arranged at positions getting across a tangent line shared by the two adjacent pulleys.

16. The transfer apparatus of claim 14, wherein the short roller conveyor device has a wall shape member and a plurality of pulleys,
wherein a plurality of the short rollers and a plurality of the pulleys are rotatably and axially fixed to the wall shape member, and
wherein the annular member is suspended on the pulleys.

17. The transfer apparatus of claim 14,
wherein the short roller conveyor device has a plurality of wall shape members,
wherein a plurality of pulleys, a plurality of the short rollers, and the annular member are attached to each of the wall shape members to form the narrow conveyor including the short roller row,
wherein the wall shape members are supported by a support member and stand at fixed intervals in parallel, and
wherein each of the wall shape members is arranged between the rollers of the roller conveyor device.

18. The transfer apparatus of claim 14,
wherein the power source of the short roller conveyor device is a long drive roller, and
wherein one of the drive rollers is engaged with a plurality of the annular members.

19. A transfer apparatus comprising:
a frame;
a main conveying conveyor section that has a main conveying passage placed in a fixed planar region for conveying a conveyed item in a fixed direction;
an auxiliary conveying conveyor section that has an auxiliary conveying passage arranged in the same planar region as the main conveying passage for conveying the conveyed item in the direction crossing the conveying direction of the main conveying passage; and
a lifting and lowering unit that lifts and lowers at least one of the main conveying conveyor section and the auxiliary conveying conveyor section so as to lift one of the conveying passages to the upper side of the other conveying passage and to convey the conveyed item in the desired direction,
wherein one of the main conveying conveyor section and the auxiliary conveying conveyor section is a wide conveyor device in which a plurality of long rotation members having predetermined length is arranged in parallel, whereas the other conveying conveyor section is a narrow conveyor device in which a plurality of small rotation member rows are arranged in parallel,
wherein each of the small rotation member rows has a plurality of short rotation members arranged along the longitudinal direction of the long rotation members with rotation axes thereof placed in the direction crossing rotation axes of the long rotation members, and
wherein the narrow conveyor device comprises:
a plurality of annular members arranged along the row of the short rotation members so as to transmit mechanical power to the short rotation members rotating in accordance with running of the annular members by contacting with the short rotation members directly or indirectly,
the annular members each having an inner circumference and an outer circumference; and
a power source that runs the annular members,
wherein the mechanical power is transmitted to the short rotation members by making the short rotation members contact the outer circumference of one of the annular members.

20. The transfer apparatus of claim 19,
wherein the long rotation members are rollers, whereas the short rotation members are short rollers; and
wherein the wide conveyor device is a roller conveyor device, whereas the narrow conveyor device is a short roller conveyor device.

21. A transfer apparatus comprising:
a frame;
a main conveying conveyor section that has a main conveying passage placed in a fixed planar region for conveying a conveyed item in a fixed direction;
an auxiliary conveying conveyor section that has an auxiliary conveying passage arranged in the same planar region as the main conveying passage for conveying the conveyed item in the direction crossing the conveying direction of the main conveying passage; and
a lifting and lowering unit that lifts and lowers at least one of the main conveying conveyor section and the auxiliary conveying conveyor section so as to lift one of the conveying passages to the upper side of the other conveying passage and to convey the conveyed item in the desired direction,
wherein one of the main conveying conveyor section and the auxiliary conveying conveyor section is a roller conveyor device in which a plurality of long rollers are arranged in parallel, whereas the other conveying conveyor section is a short roller conveyor device in which a plurality of short roller rows are arranged in parallel,
wherein each of the short roller rows has a plurality of short rollers arranged along the longitudinal direction of the long rollers with rotation axes thereof placed in the direction crossing rotation axes of the long rollers, wherein the short roller conveyor device comprises:
  a plurality of annular members arranged along the row of the short rollers so as to transmit mechanical power to the short rollers rotating in accordance with running of the annular members by contacting with the short rollers directly or indirectly; and
  a power source that runs the annular members, and
wherein the short rollers press an upper surface of the annular member on a conveying passage side.

* * * * *